(12) United States Patent
Nachmanson et al.

(10) Patent No.: US 8,933,937 B2
(45) Date of Patent: Jan. 13, 2015

(54) VISUALIZING A LAYERED GRAPH USING EDGE BUNDLING

(75) Inventors: Lev B. Nachmanson, Redmond, WA (US); Sergey Pupyrev, Ekaterinburg (RU)

(73) Assignee: Microsoft Corporation, Redmond, WA (US)

( * ) Notice: Subject to any disclaimer, the term of this patent is extended or adjusted under 35 U.S.C. 154(b) by 1050 days.

(21) Appl. No.: 12/691,737

(22) Filed: Jan. 22, 2010

(65) Prior Publication Data

US 2011/0181595 A1 Jul. 28, 2011

(51) Int. Cl.
*G06T 11/20* (2006.01)
*G09G 5/14* (2006.01)
*G06F 17/24* (2006.01)
*G06F 3/0481* (2013.01)

(52) U.S. Cl.
CPC ...... *G06T 11/20* (2013.01); *G09G 5/14* (2013.01); *G06F 17/246* (2013.01); *G06F 3/0481* (2013.01); *G06T 11/206* (2013.01)
USPC .......................................... 345/440; 345/629

(58) Field of Classification Search
CPC ... G06T 11/206; G06F 3/0481; G06F 17/246; G09G 5/14; G09G 2340/10
USPC .................................. 345/440, 629; 715/853
See application file for complete search history.

(56) References Cited

U.S. PATENT DOCUMENTS

| | | | |
|---|---|---|---|
| 5,450,535 A | 9/1995 | North | |
| 6,239,813 B1 | 5/2001 | Erskine | |
| 6,781,599 B2 | 8/2004 | Abello et al. | |
| 6,892,371 B1 | 5/2005 | Teig et al. | |
| 2005/0273746 A1 | 12/2005 | Malhotra et al. | |
| 2006/0290697 A1 | 12/2006 | Madden et al. | |
| 2008/0276201 A1* | 11/2008 | Risch et al. | 715/853 |
| 2010/0060642 A1* | 3/2010 | Chhaparwal et al. | 345/440 |
| 2010/0060643 A1* | 3/2010 | Kolipaka et al. | 345/440 |
| 2010/0182322 A1 | 7/2010 | Gansner et al. | |
| 2012/0280999 A1* | 11/2012 | Nachmanson et al. | 345/440 |

OTHER PUBLICATIONS

Holten, Danny et al., "Force-Directed Edge Bundling for Graph Visualization", Eurographics/IEEE-VGTC Symposium on Visualization, vol. 28, 2009, No. 3, p. 1-8.*
Holten, D. "Hierarchical Edge Bundles: Visualization of Adjacency Relations in Hierarchical Data", IEEE Transactions on Visualization and Computer Graphics (Proc. of INFOVIS'06), vol. 12, No. 5, Sep./Oct. 2006, p. 1-8.*
Nachmanson, et al., U.S. Appl. No. 13/101,162, "Routing Edges with Ordered Bundles," filed May 5, 2011, 57 pages.

(Continued)

*Primary Examiner* — Chante Harrison
(74) *Attorney, Agent, or Firm* — Judy Yee; Sandy Swain; Micky Minhas

(57) ABSTRACT

A graph processing module is described for producing a visualization of a layered graph. The graph processing module operates by: bundling edges in the layered graph to produce respective edge bundles; ordering the edges associated with the edge bundles to reduce edge crossings; straightening the edges; and separating the edges in the edges bundles with respect to each other. The graph processing module can operate on a layered graph produced by the Sugiyama algorithm or some other technique, reducing clutter in the layered graph and thus improving a user's understanding of the layered graph.

20 Claims, 14 Drawing Sheets

(56) References Cited

OTHER PUBLICATIONS

Lai, Wei, "Layout Adjustment and Boundary Detection for a Diagram," retrieved at http://ieeexplore.ieee.org/stamp/stamp.jsp?arnumber=00934697>>, Proceedings of the International Conference on Computer Graphics, 2001, pp. 351-354.
Eades, et al., "Straight-Line Drawing Algorithms for Hierarchical Graphs and Clustered Graphs," retrieved at http://www.cs.uoi.gr/~fpechliv/master/Related%20Work/About%20Graphs/Algorithmica.pdf>>, Algorithmica, No. 44, 2006, pp. 1-32.
Holten, et al., "Force-Directed Edge Bundling for Graph Visualization," retrieved at http://www.win.tue.nl/~dholten/papers/forcebundles_eurovis.pdf>>, Computer Graphics Forum, Proceedings of EuroVis 2009, vol. 28, No. 3, 2009, 8 pages.
"Diagram Edges 1.0 Requirements Specification," retrieved at <<http://software.topcoder.com/catalog/document?id=24670944>>, TopCoder Software, Inc., Glastonbury, Connecticut, 2002, 4 pages.
Eades, et al., "How to Draw a Directed Graph," Journal of Information Processing, vol. 13, No. 4, 1990, pp. 424-437.
Eades, et al., "Edge Crossings in Drawings of Bipartite Graphs," Algorithmica, vol. 11, No. 4, 1994, pp. 379-403.
Newbery, Frances J., "Edge concentration: A Method for Clustering Directed Graphs," Proceedings of the 2nd International Workshop on Software Configuration Management, 1989, pp. 76-85.
"Model-based Testing with SpecExplorer," project page, retrieved at <<http://research.microsoft.com/en-us/projects/specexplorer/>>, retrieved on Jan. 12, 2010, Microsoft Corporation, Redmond, WA, 3 pages.
Argyriou, et al., "Two Polynomial Time Algorithms for the Metro-line Crossing Minimization Problem," retrieved at <<http://www.math.ntua.gr/~mikebekos/pubs/GD2008.pdfGraph>>, Graph Drawing: 16th International Symposium, GD 2008, Heraklion, Crete, Greece, Sep. 21-24, 2008, 15 pages.
Bekos, et al., "Line Crossing Minimization on Metro Maps," retrieved at <<http://citeseerx.ist.psu.edu/viewdoc/download?doi=10.1.1.114.6776&rep=repl&type=pdf>>, Journal of Graph Algorithms and Applications, 2007, 20 pages.
Cui, et al., "Geometry-Based Edge Clustering for Graph Visualization," retrieved at <<http://www.cse.ust.hk/~zhouhong/articles/infovis08_weiwei.pdf>>, IEEE Transactions on Visualization and Computer Graphics (Proc. InfoVis 2008), vol. 14, 8 pages.
Eiglsperger, et al., "An Efficient Implementation of Sugiyama's Algorithm for Layered Graph Drawing," retrieved at http://www.emis.de/journals/JGAA/accepted/2005/EiglspergerSiebenhallerKaufmann2005.9.3.pdf>> Journal of Graph Algorithms and Applications, vol. 9, No. 3, 2005, pp. 305-325, 2005, 21 pages.
Ellis, et al., "A Taxonomy of Clutter Reduction for Information Visualization," retrieved at <<http://eprints.comp.lancs.ac.uk/1434/1/Ellis_%26_Dix_clutter_reduction_taxonomy_5.3.pdf>>, IEEE Transactions on Visualization and Computer Graphics, vol. 13, No. 6, 2007, 8 pages.
Eppstein, et al., "Confluent Layered Drawings," Graph Drawing (GD 2004), LNCS 3383, 2004, pp. 184-194, 11 pages.
Gansner, et al., Improved Circular Layouts, retrieved at <<http://www2.research.att.com/areas/visualization/papers_videos/pdf/DBLP-conf-gd-GansnerK06.pdf>>, Graph Drawing, 2006, 12 pages.
Ganser, et al., "A Technique for Drawing Directed Graphs," retrieved at <<http://www.graphviz.org/Documentation/TSE93.pdf>>, IEEE Transactions on Software Engineering, vol. 19, No. 3, 1993, 33 pages.
Holten, Danny, "Hierarchical Edge Bundles: Visualization of Adjacency Relations in Hierarchical Data," retrieved at <<http://www.win.tue.nl/~dholten/papers/bundles_infovis.pdf>>, IEEE Transactions on Visualization and Computer Graphics, vol. 12, No. 5, 2006, 8 pages.
Lancichinetti, et al., "Benchmark Graphs for Testing Community Detection Algorithms," retrieved at <<http://filrad.homelinux.org/Mypapers/pre78_046110_2008.pdf>>, Physical Review E, vol. 80, No. 1, 2008, 5 pages.
Nachmanson, et al., "Drawing Graphs with GLEE," retrieved at <<http://research.microsoft.com/pubs/64284/gd2007-glee.pdf>>, Proceedings of the 15th International Symposium on Graph Drawing, GD 2007, LNCS 4875, 2007, 6 pages.
Tufte, Edward, R., "The Visual Display of Quantitative Information," abstract provided by Amazon.com, retrieved at <<http://www.amazon.com/Visual-Display-Quantitative-Information-2nd/dp/0961392142/ref=sr_1_1?ie=UTF8&s=books&qid=1263342059&sr=1-1#noop>>, retrieved on Jan. 12, 2009, Graphics Press, Cheshire, Connecticut, 1983, 7 pages.
"Layered Graph Drawing (Sugimura Method)," retrieved at <<www.ics.uci.edu/~ses/papers/grafdraw.pdf>>, retrieved Jan. 11, 2010, 48 pages.
Van Dalen, et al., "On Automated Graph Layout: An Algorithmic and Declarative Approach Designed and Implemented in the Functionality System Clarity," retrieved at http://userweb.portac.uk/~addist/Layoutpdf>>, Jun. 2001, 27 pages.
Sim, Susan, "Automatic Graph Drawing Algorithms," retrieved at <<www.ics.uci.edu/~ses/papers/grafdraw.ps>>, Dec. 17, 1996, 16 pages.
Lambert, et al., "Winding Roads: Routing edges into bundles," retrieved at <<http://hal.archives-ouvertes.fr/docs/00/49/52/79/PDF/Winding_Roads_Eurovis2010.pdf>>, Proceedings of the Eurographics/IEEE-VGTC Symposium on Visualization, vol. 29, No. 3, 2010, 10 pages.
Lambert, et al., "3D Edge Bundling for Georgraphical Data Visualization," retrieved at <<http://hal.archives-ouvertes.fr/docs/00/49/53/07/PDF/3d_Edge_Bundling_IV10.pdf>>, Proceedings of the 14th International Conference on Information Visualization, 2010, 8 pages.
Dickerson, "Confluent Drawings: Visualizing Non-planar Diagrams in a Planar Way," retrieved at <<www.cs.brown.edu/sites/jgaa/accepted/2005/Dickerson+2005.9.1.pdf>>, Journal of Graph Algorithms and Applications, vol. 9, No. 1, 2005, pp. 31-52.
Duncan, et al., "Drawing with Fat Edges," retrieved at <<http://www.cs.arizona.edu/~kobourov/fatedges.pdf>>, Proceedings of the 9th International Symposium on Graph Drawing, 2001, 16 pages.
Dwyer, et al., "Fast Edge-routing for Large Graphs,", retrieved at <<http://research.microsoft.com/pubs/81239/routing.pdf>>, Proceedings of the 17th International Symposium on Graph Drawing, 2009, 15 pages.
Lambert, et al., "Living flows: enhanced exploration of edge-bundled graphs based on GPU-intensive edge rendering," retrieved at <<http://hal.archives-ouvertes.fr/docs/00/49/52/93/PDF/Living_flows_IV10.pdf>>, Proceedings of the 2010 14th International Conference on Information Visualization, 2010, 8 pages.
Nachmanson, Lev B., "Ordered Bundles," retrieved at <<http://research.microsoft.com/en-us/um/people/levnach/orderedBundles.aspx>>, Microsoft Research, Microsoft Corporation, Redmond, WA, retrieved on Jun. 13, 2011, 3 pages.
Wybrow, et al., "Orthogonal Connector Routing," retrieved at <<http://www.csse.monash.edu.au/~marriott/WybMarStu09.pdf>>, In Proceedings of the 17th International Symposium on Graph Drawing, 2009, 12 pages.
Wein, et al., "The Visibility-voronoi Complex and its Applications," retrieved at <<www.cs.unc.edu/~berg/EWCG2005.pdf>>, EWCG 2005, Eindhoven, Mar. 2005, pp. 151-154.
Nollenburg, Marten, "An Improved Algorithm for the Metro-line Crossing Minimization Problem," retrieved at <<http://i11www.iti.uni-karlsruhe.de/extra/publications/n-iamlc-10.pdf>>, Proceedings of the 17th International Symposium on Graph Drawing, 2020, 12 pages.
Phan et al., "Flow Map Layout," retrieved at <<http://graphics.stanford.edu/papers/flow_map_layout/flow_map_layout.pdf>> Proceedings of the 2005 IEEE Symposium on Information Visualization, 2005, 6 pages.

(56) References Cited

OTHER PUBLICATIONS

Pupyrev, et al., "Improving Layered Graph Layouts with Edge Bundling," retrieved at <<http://sites.google.com/site/spupyrev/publications>> Proceedings of the 18th International Symposium on Graph Drawing, Sep. 2010, 12 pages.

Telea, et al., Image-based Edge Bundles: Simplified Visualization of Large Graphs, retrieved at <<http://www.cs.rug.nl/·alext/PAPERS/EuroVis10/paper.pdf>>, Eurographics IEEE-VGTC Symposium on Visualization, vol. 29, No. 3, 2010, 10 pages.

Office Action mailed Feb. 27, 2014 for U.S. Appl. No. 13/101,162, filed May 5, 2011, 15 pages.

Response filed Jul. 28, 2014, in response to Office Action mailed Feb. 27, 2014 for U.S. Appl. No. 13/101,162, filed May 5, 2011, 18 pages.

* cited by examiner

VISUALIZING A LAYERED GRAPH USING EDGE BUNDLING

BACKGROUND

A graph is often used to represent the behavior or structure of a complex system. For example, in the field of computer science, design engineers commonly use graphs to represent dependencies among components in complex software systems. Design engineers also use graphs to represent state machines associated with complex systems.

Commonly, a user will wish to display the graph in some form to gain insight regarding the relationships represented therein. In many cases, however, the amount of detail in the graph hinders a user's comprehension of the graph. To address this problem, users commonly resort to automated techniques for organizing the graph to make it easier to understand.

One commonly-used visualization technique is known as the Sugiyama algorithm. The Sugiyama algorithm operates by structuring the nodes of the graph in a hierarchy having multiple layers. The algorithm also arranges the positions of the nodes in the graph to improve visual comprehension. For instance, the Sugiyama algorithm can reduce the number of edge crossings in the graph. By virtue of these operations, the Sugiyama algorithm may produce a less cluttered visualization of the graph.

However, techniques like the Sugiyama algorithm are not fully satisfactory in all cases, especially for graphs that have a large amount of detail. That is, the output of the Sugiyama algorithm can sometimes produce visualizations that are perceived as aesthetically unappealing and confusing.

SUMMARY

A graph processing module is described herein for visualizing a graph. In one illustrative implementation, the graph processing module can operate by receiving input in the form of a layered graph that includes a set of nodes and edges, the nodes being arranged in a set of layers. The functionality can then: (a) iteratively bundle pairs of edges in the layered graph to produce respective edge bundles; (b) order edge components associated with each edge bundle to reduce edge crossings; (c) straighten the edge bundles; and (d) separate edge components associated with each edge bundle with respect to each other. This process yields a processed graph which can be presented on any type of output device, such as a display device.

According to one illustrative feature, the graph processing module can receive the layered graph from the Sugiyama algorithm or some other technique. The graph processing module improves the visual appearance of this input layered graph. This, in turn, facilitates a user's understanding of the graph. More specifically, the graph processing module can reduce clutter within the input layered graph and, in doing so, reveal patterns that may be present in the layered graph.

According to another illustrative feature, after bundling, ordering, straightening, and widening, the graph processing module routes the edges around node objects (associated with nodes).

The above approach can be manifested in various types of systems, devices, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for visualizing a graph to facilitate understanding of the graph. The disclosure has the following sections. Section A describes an illustrative graph processing module for processing a layered graph. Section B describes illustrative methods which explain the operation of the graph processing module of Section A. Section C describes illustrative processing functionality that can be used to implement any aspect of the features described in Sections A and B.

Figure 14:
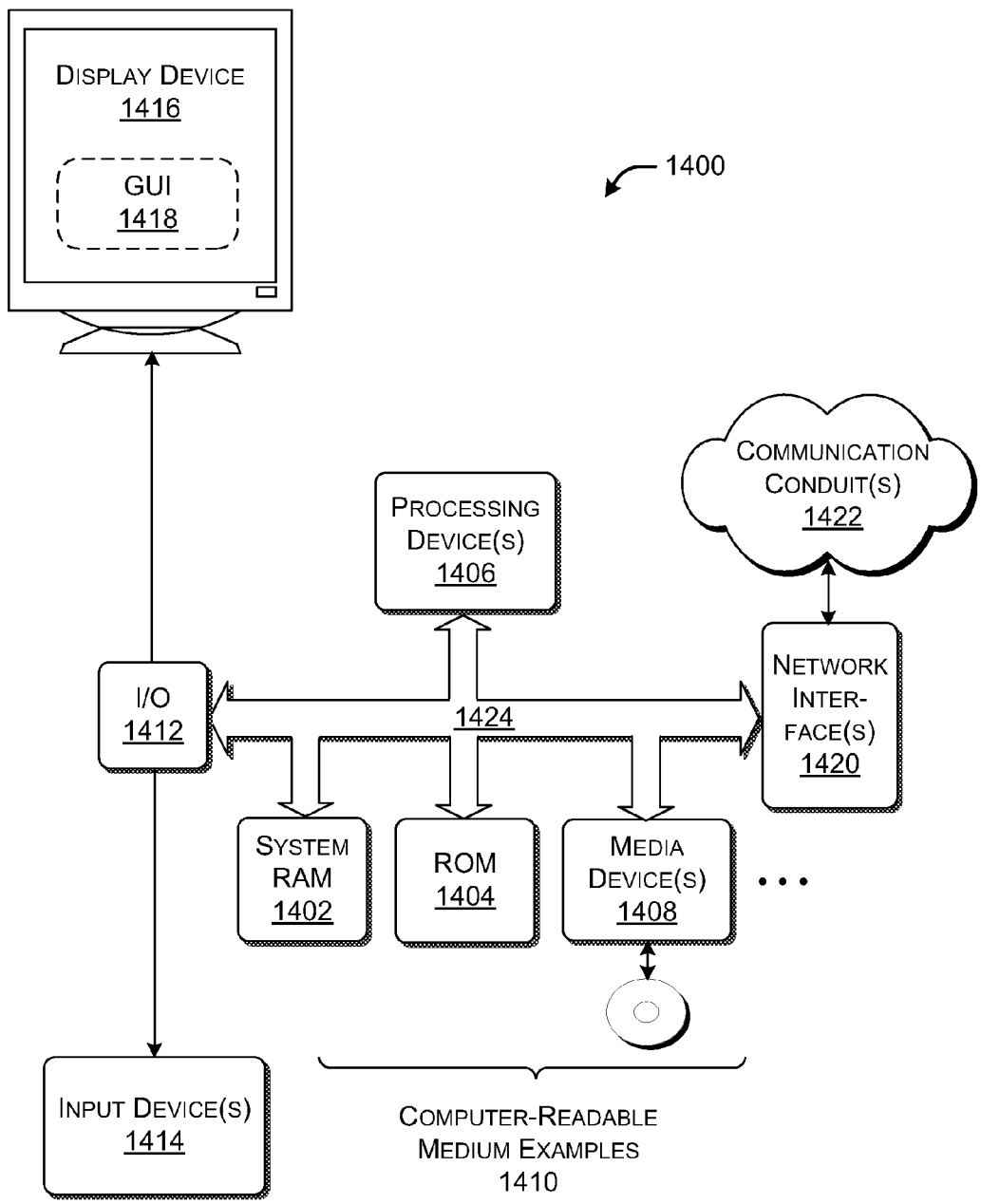
FIG. 14 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, such as by hardware, software-implemented electrical components, and/or some combination thereof. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 14, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system (e.g., "computing functionality"), a logic component represents a physical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative System

Figure 1:
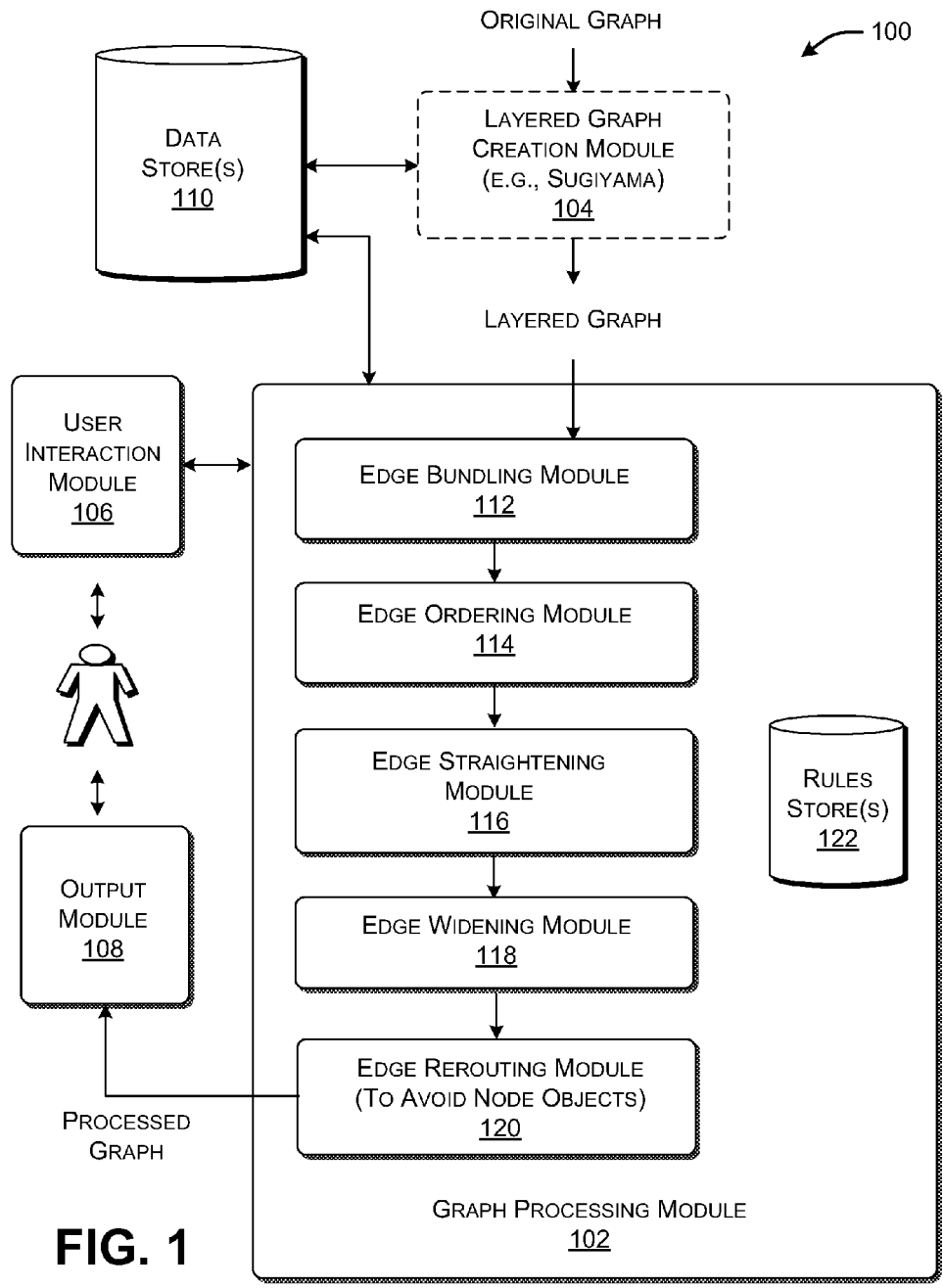
FIG. 1 shows an illustrative system for processing a layered graph to improve its visual appearance when displayed.

FIG. 1 shows an illustrative system 100 for visualizing a graph. The graph corresponds to an acyclic directed graph G having a set of nodes or vertices (V) as well as a set of relationships (or edges) (E) among the nodes. That is, an edge connecting any two nodes is considered directed if it is directed from one of the nodes to the other. While the graph is acyclic, the system 100 can process a graph with cycles by first converting it to an acyclic graph in known fashion, e.g., by reversing appropriate edges to remove cycles.

The graph can represent any type of system that can be characterized by a set of relationships among entities. That is, the graph represents the entities using nodes and the relationships among nodes as edges. In the field of computer science, the graph may represent relationships among components of a software system. Or the graph may represent a state machine associated with a physical system of any type. No limitation is placed on the interpretation of the graph; it can represent machines of any type, physical or biological phenomena, sociological phenomena, and so on.

Figure 2:
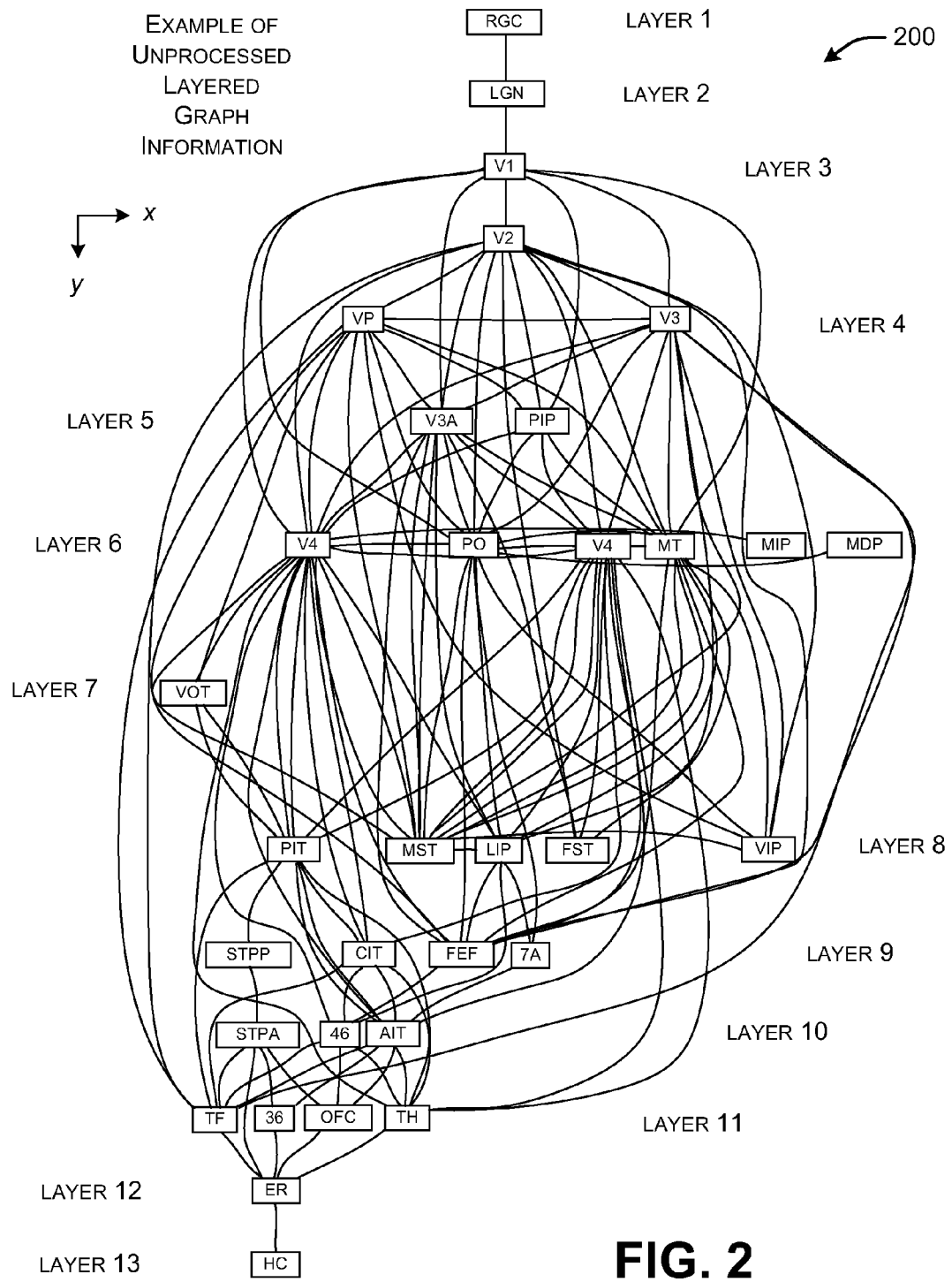
FIG. 2 shows an example of a layered graph that is processed by the system of FIG. 1.

The system 100 includes a graph processing module 102 for processing a layered graph produced by a layered graph creation module 104 (referred to as a "creation module" for brevity below). The creation module 104 produces a graph that organizes nodes in an original graph within a set of hierarchical layers. For example, FIG. 2 shows a layered graph 200 that includes 13 layers, e.g., layer$_1$-layer$_{13}$. Some edges connect nodes that appear in directly adjacent layers (e.g., layer$_i$ and layer$_{i+1}$), while other edges connect nodes that appear in non-adjacent layers. The type of hierarchical organization shown in FIG. 2 arranges the graph in a structured manner and therefore facilitates a user's understanding of the graph. (Note that the node labels in FIG. 2 represent entities associated with one particular system described by the graph, but are not otherwise relevant to the ensuing explanation.)

However, as can be readily seen, the layered graph 200 shown in FIG. 2 presents a dense mat of edges, creating a spaghetti-like effect. A user may therefore have difficulty discerning relationships among entities within the graph and high-layer patterns within the graph. The graph processing module 102 is configured to improve the organization of information presented in the layered graph, to thereby improve the user's understanding of the graph.

Any functionality can be used to implement the creation module 104. For instance, the well-known Sugiyama algorithm can be used to generate the layered graph, as disclosed, for instance, in K. Sugiyama, S. Tagawa, and M. Toda, "Methods for Visual Understanding of Hierarchical System Structures," *IEEE Transactions on Systems, Man, and Cybernetics*, Vol. 11, Issue 2, 1981, pp. 109-125.

The Sugiyama algorithm operates on a directed graph in four phases. In a first phase, the creation module 104 removes the cycles in the graph (if present) and distributes the nodes among the layers; the edges in this graph extend downward and span one or more layers. Then, the algorithm produces a proper graph $G^P$; in this graph, each edge that spans more than one layer is replaced by a sequence of downward-directed short edges, where each such short edge spans a single layer. More specifically, the proper graph $G^P$ includes two types of nodes: original nodes and virtual (or dummy) nodes. The original nodes correspond to actual entities in the graph, such as entities associated with the node labels of FIG. 2. The virtual nodes represent "artificial" nodes that are added to layers in the graph to establish the above-mentioned short edges, so as to accommodate subsequent processing. For instance, consider the case of a long edge that begins at an original source node in a first layer and terminates in an original target node in a second layer, spanning multiple intermediate layers in between the source and target nodes; the Sugiyama algorithm can assign one or more virtual nodes to the edge for the intermediate layers.

Generally, in the following explanation, a source node refers to the beginning of an edge, while a target node refers to the end of the edge. A source node can correspond to an original node or a virtual node; similarly, a target node can correspond to an original node or a virtual node. Further, as shown in FIG. 2, an x axis for a depiction of a graph refers to a direction which spans across the nodes of a particular layer. A y axis spans across the layers of the graph. Thus, the nodes in a same layer have the same y coordinate.

In a second phase, the Sugiyama algorithm reduces the edge crossings in the proper graph $G^P$. It performs this task by ordering the nodes inside the respective layers. In a third phase, the Sugiyama algorithm calculates the horizontal (x coordinate) positions of the nodes in the proper graph $G^P$. More specifically, according to one technique, the third phase uses a priority-layout approach to calculate the positions of the nodes in order to improve the appearance of the resultant graph. Finally, in a fourth phase, the Sugiyama algorithm provides smooth curves for the edges by using information regarding the edges and by avoiding node objects associated with the original nodes.

To emphasize, however, the graph processing module 102 is not limited for use in post-processing the output of the Sugiyama algorithm. The graph processing module 102 can be used to process a layered graph produced by other techniques.

Now advancing to an explanation of the graph processing module 102 itself, this module can correspond to any computing functionality or combination of computing functionality provided at any site or combination of sites. In a local implementation, the graph processing module 102 may correspond to a local computing device operated by a user, such as a personal computer, laptop computer, etc. In a remote implementation, the graph processing module 102 may correspond to network-accessible functionality which the user can access from a remote location (with respect to the functionality).

A user may interact with the graph processing module 102 using a user interaction module 106. The user interaction module 106 represents any functionality for processing inputs provided by the user via any type of input device or any combination of input devices. The graph processing module 102 can present the results of its analysis (referred to herein as a processed graph) using an output module 108. The output module 108 represents any functionality for presenting the processed graph on an output device of any type, or a combination of output devices. The output device may correspond to a display device, such as a computer monitor, a projector, or the like. Alternatively, or in addition, the output device can correspond to a printer which produces a printed rendition of the processed graph. Alternatively, or in addition, the output device can correspond to a model-generation machine which generates a physical model (e.g., a three-dimensional model) that represents the processed graph. Alternatively, or in addition, the output device may correspond to a store which retains the processed graph in memory of any type, and so on. FIG. 1 also shows any type of data store(s) 110 which stores graph-related data produced at any stage of the processing, to be described below.

The graph processing module 102 can be configured in any manner. In one case, the graph processing module 102 is implemented using hardware components and/or software-implemented electronic components. In the latter case, the components perform operations in response to the execution of instructions stored in memory of any type.

The graph processing module 102 itself can include (or can be conceptualized to include) multiple components. Section A describes the operations performed by these components in overview fashion. Section B provides a more detailed explanation of the operation of each component. In the following, the general term "graph" is used for brevity to refer to any graph-related information as it exists at various stages of processing; in the case that the input is received from the Sugiyama algorithm, the graph that is input corresponds to a proper graph $G^p$ having a collection of original nodes an virtual nodes.

First, an edge bundling module 112 receives a layered graph from the creation module 104. The edge bundling module 112 iteratively bundles pairs of edges in the layered graph to produce respective edge bundles. That is, the edge bundling module 112 attempts, at each iteration, to reduce an ink metric associated with the graph in its present state. As will be explained in greater detail below, the ink metric represents a minimum collective length of edges that can be used to draw the graph. Each edge bundle thus produced can be said to encompass or represent two or more edge components.

An edge ordering module 114 successively operates on each of the edge bundles to order the edge components associated with that edge bundle. It performs this task to reduce the crossing of the edge components associated with the edge bundle.

An edge straightening module 116 straightens the edges in the graph. This operation helps improve the visual appearance of the resultant graph, e.g., by reducing the appearance of meandering spaghetti-like edges. In one case, the edge straightening module 116 operates by successively processing each identified node set in the graph (to be described), proceeding layer by layer. As will be explained, when processing an identified node set, associated with a bundled node, the edge straightening module 116 adjusts the position of that bundled node with respect to a neighboring node set that is associated with a neighboring layer.

An edge widening module 118 operates on each of the edge bundles to move the edge components in the edge bundle apart from each other, as governed by a separation parameter $\delta$. This operation helps disambiguate the constituents of an edge bundle, yet allows the edge bundle to retain the visual appearance of a bundle.

An edge rerouting module 120 reroutes all edges that overlap with node objects in the graph (e.g., associated with a node label or the like). It performs this task by directing the edge around the node object.

The output module 108 can receive the output of the graph processing module 102. As said, in one case, the output module 108 can display the processed graph for visual inspection by the user. The system 100 can also allow the user to interact with the processed graph. For example, the output module 108 can allow the user to modify the appearance of the processed graph, e.g., to highlight various features of interest. For example, the output module 108 can allow the use to zoom in on (or otherwise highlight) a feature of interest within the graph, including an individual node or edge. The output module 108 can also allow the user to selectively remove content from the graph.

As will be described, one or more of the components of the graph processing module 102 are governed by rules which constrain their behavior. One or more rule stores 122 can store those rules. The components can interact with the rules stored therein. A user can selectively enable and disable the rules and/or modify existing rules and/or create additional rules. Generally, the rules are described in connection with one representative implementation; such rules may not be binding on other implementations and therefore should not be construed in an absolute or limiting way.

Figure 3:
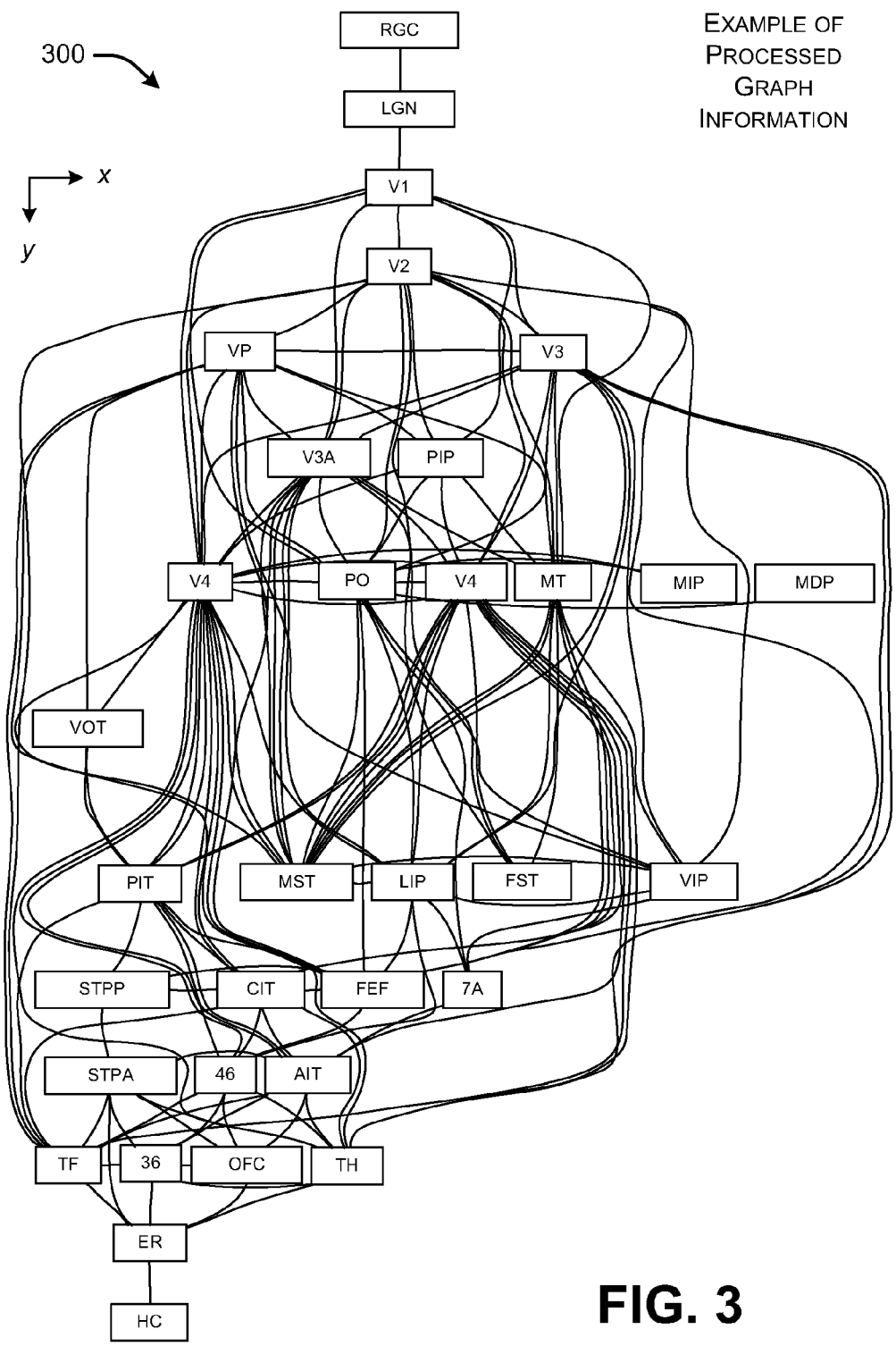
FIG. 3 shows an example of a processed graph that is produced by transforming the layered graph of FIG. 2 using the system of FIG. 1.

FIG. 3 shows a representative processed graph 300 produced by the graph processing module 102. First, note that the edge bundling operation has the effect of grouping the meandering edges shown in FIG. 2, producing a more structured presentation compared to FIG. 2. Second, note that the edge ordering operation may have the effect of reducing the number of edge crossing associated with the edge bundles. Third, note that the edge straightening operation has the effect of creating greater alignment of edges compared to the case of FIG. 2. Fourth, note that the edge widening operation has the effect of separating the edge components of the bundles so that they are easier to see. Fifth, note that the edge rerouting operation (if applied) has the effect of reducing the intersection of edges with the node objects (corresponding to the labeled boxes in FIG. 3). Taken all together, the processed graph 300 may be more successful in reducing the user's confusion when viewing the graph compared to the original layout of FIG. 2. Further, the processed graph 300 may be more successful in revealing high level patterns within the graph compared to the original layout of FIG. 2.

B. Illustrative Processes

FIGS. 4-13 show procedures in flowchart form which explain one manner of operation of the system 100 of FIG. 1. These figures also include depictions of graph processing which complement the flowcharts, clarifying the concepts imparted by the flowcharts.

Figure 4:
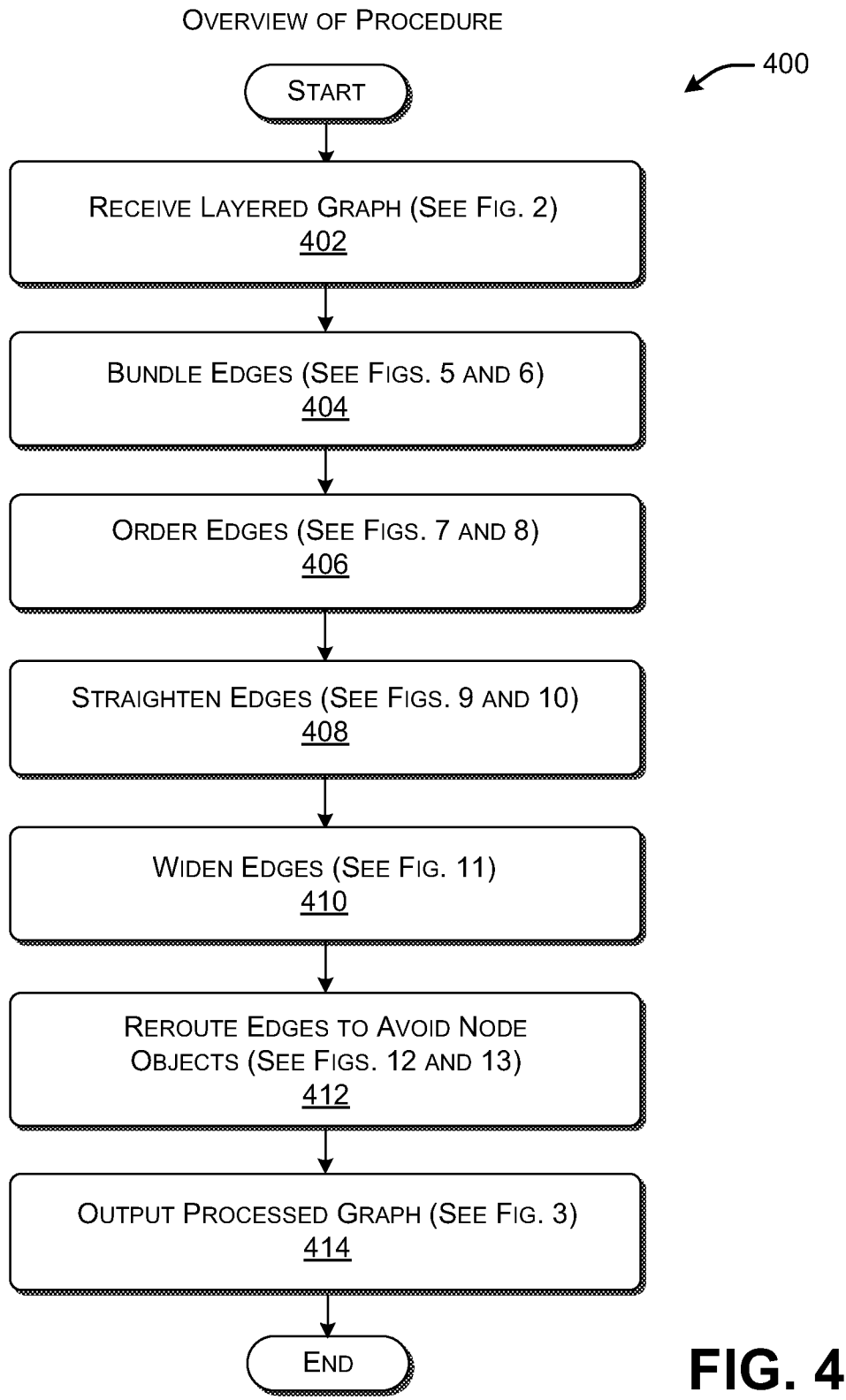
FIG. 4 is a flowchart which shows an overview of one manner of operation of the system of FIG. 1.
Figure 5:
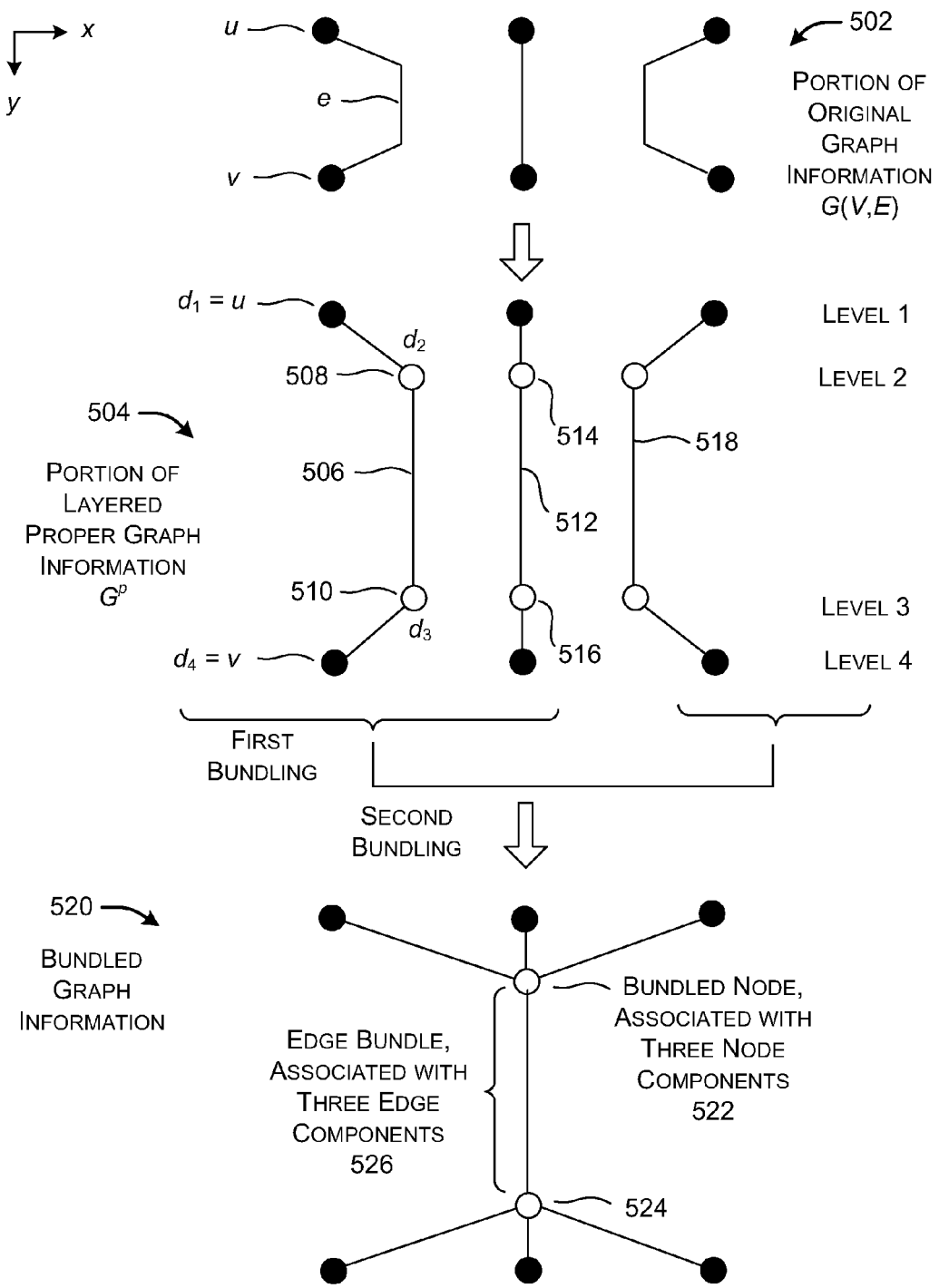
FIG. 5 depicts operations performed on the graph in connection with a bundling operation identified in FIG. 4.
Figure 6:
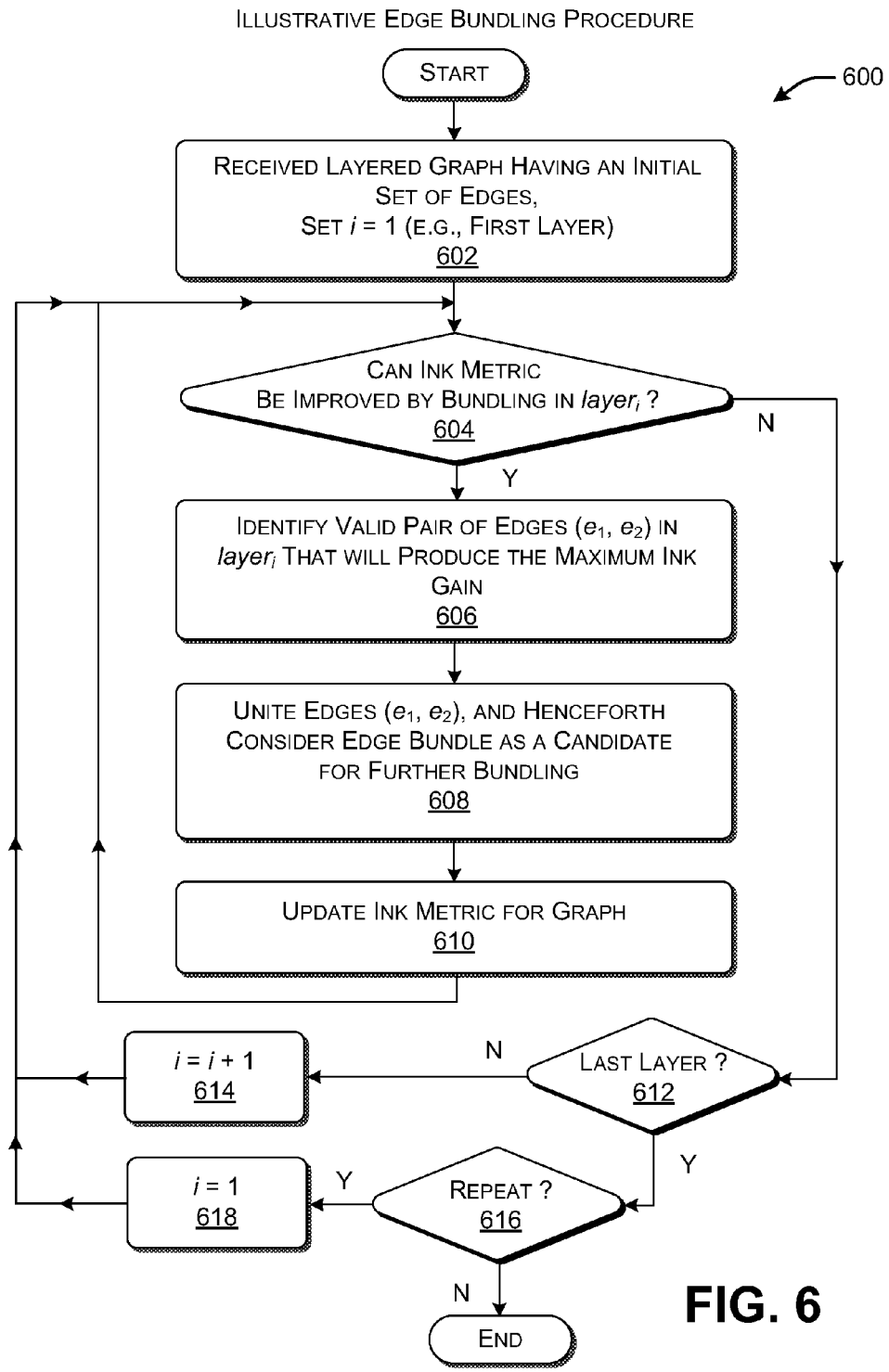
FIG. 6 is a flowchart that shows the bundling operation of FIG. 4.
Figure 7:
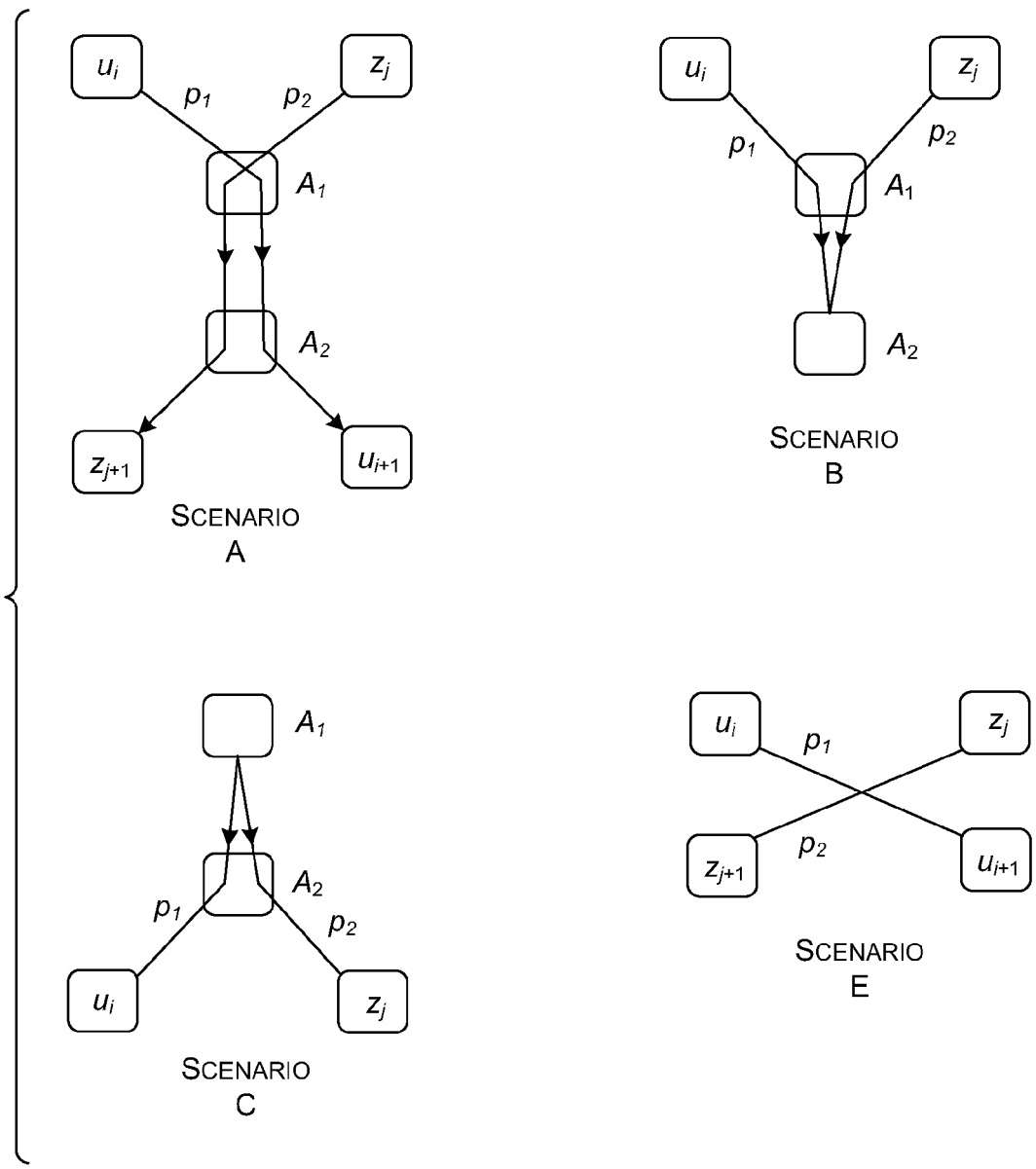
FIG. 7 depicts operations performed on the graph in connection an edge ordering operation identified in FIG. 4.
Figure 8:
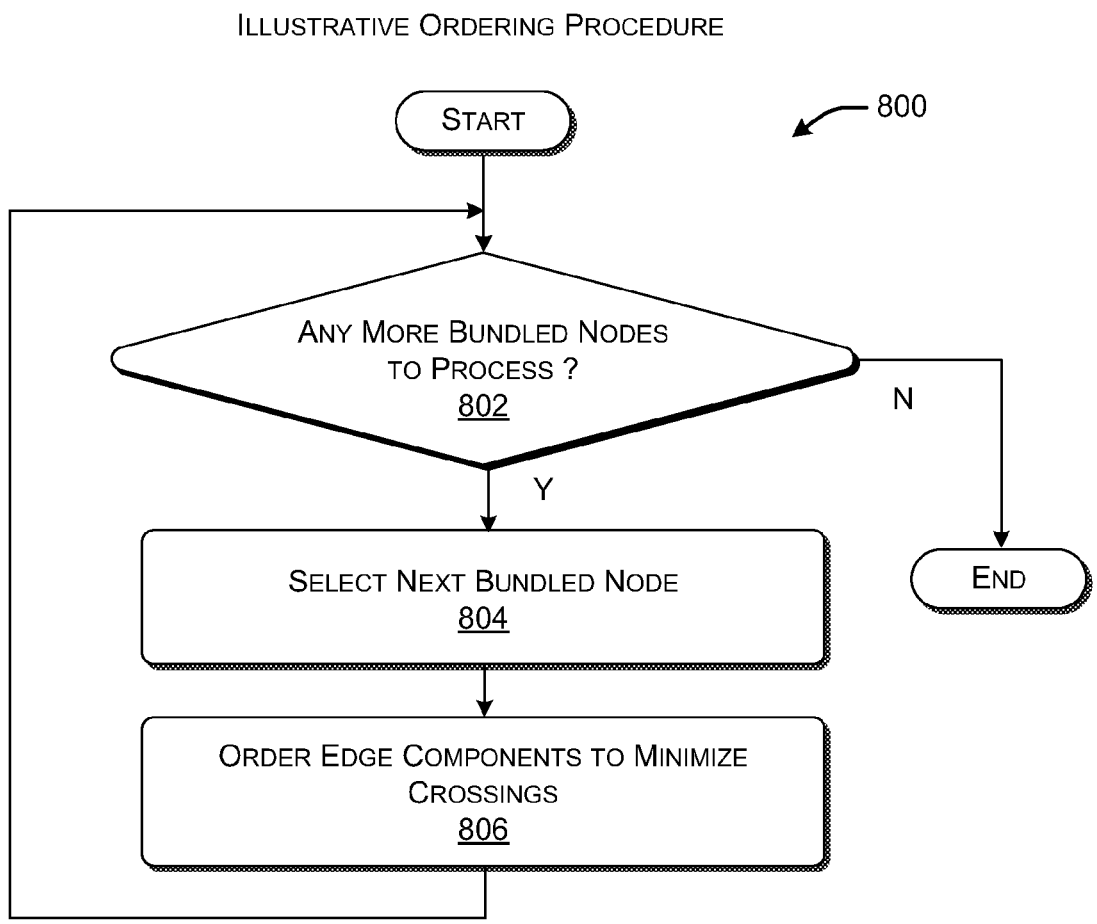
FIG. 8 is a flowchart which shows the edge ordering operation of FIG. 4.
Figure 9:
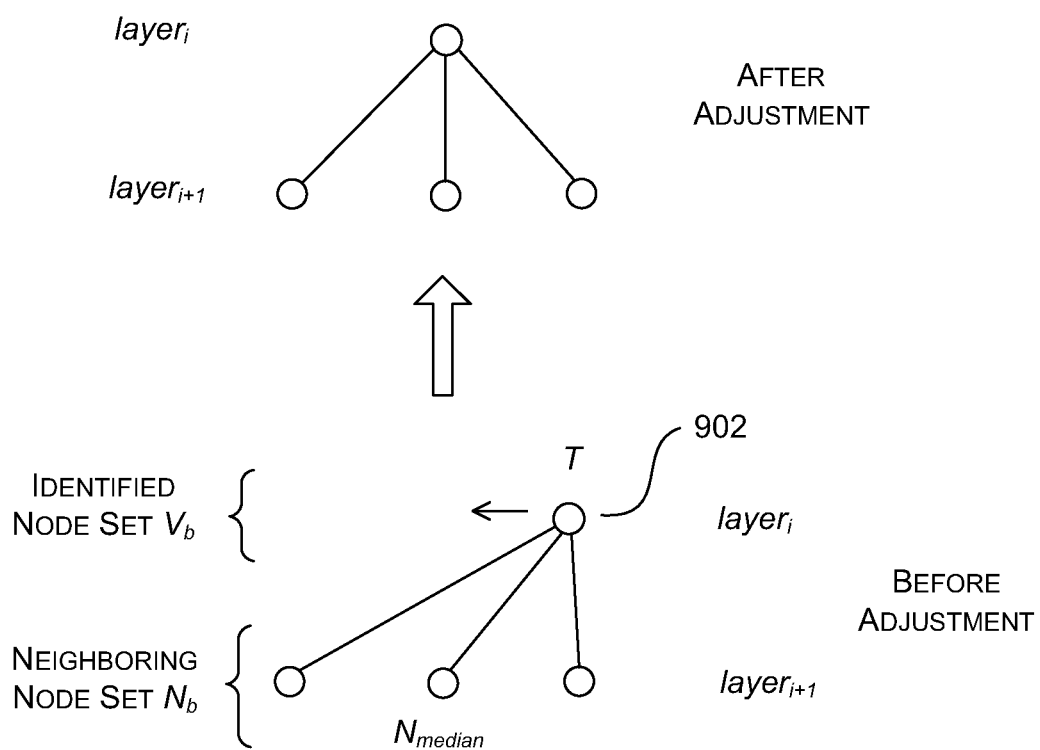
FIG. 9 depicts operations performed on the graph in connection with an edge straightening operation identified in FIG. 4.
Figure 10:
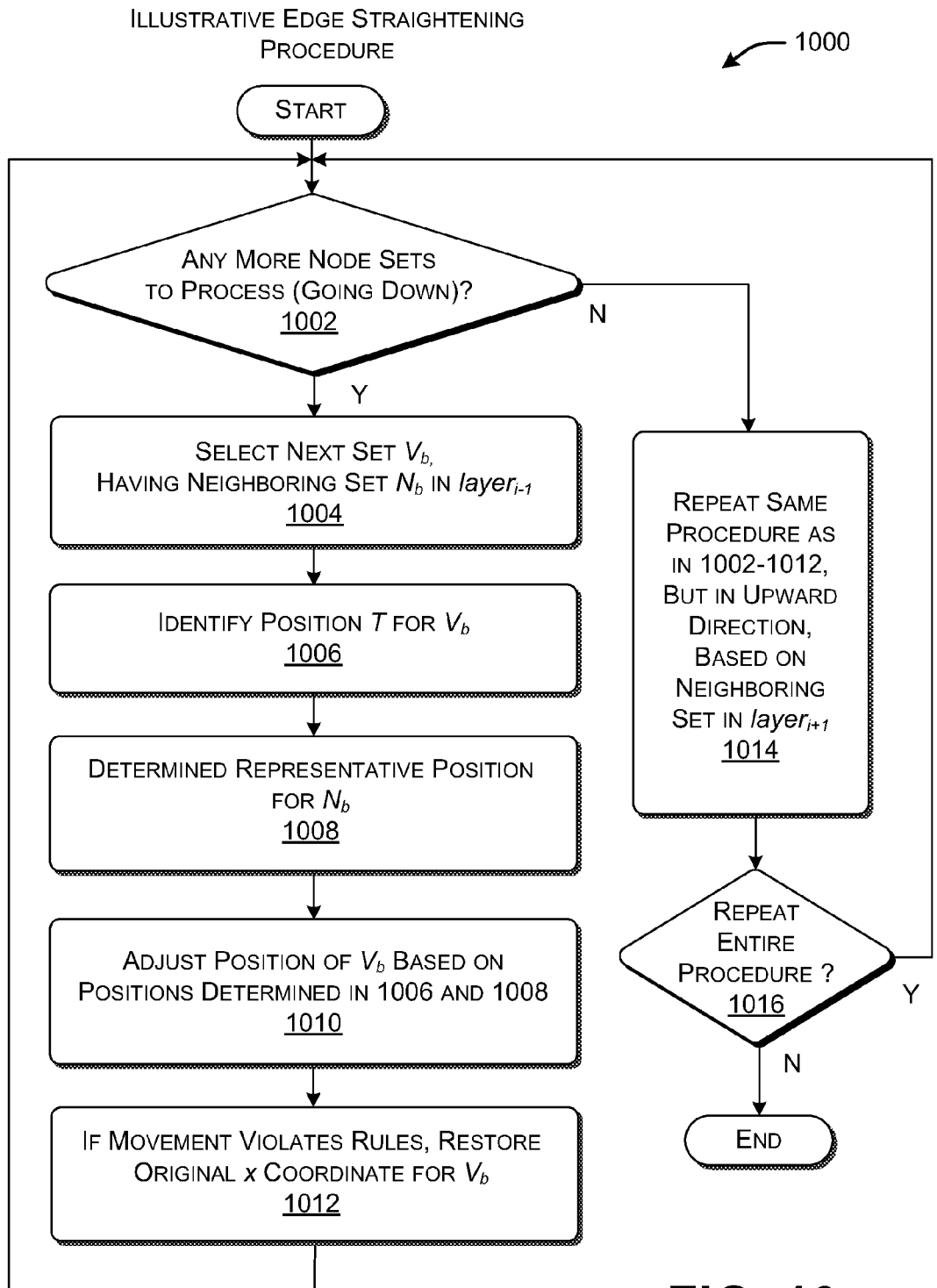
FIG. 10 is a flowchart which shows the edge straightening operation of FIG. 4.
Figure 11:
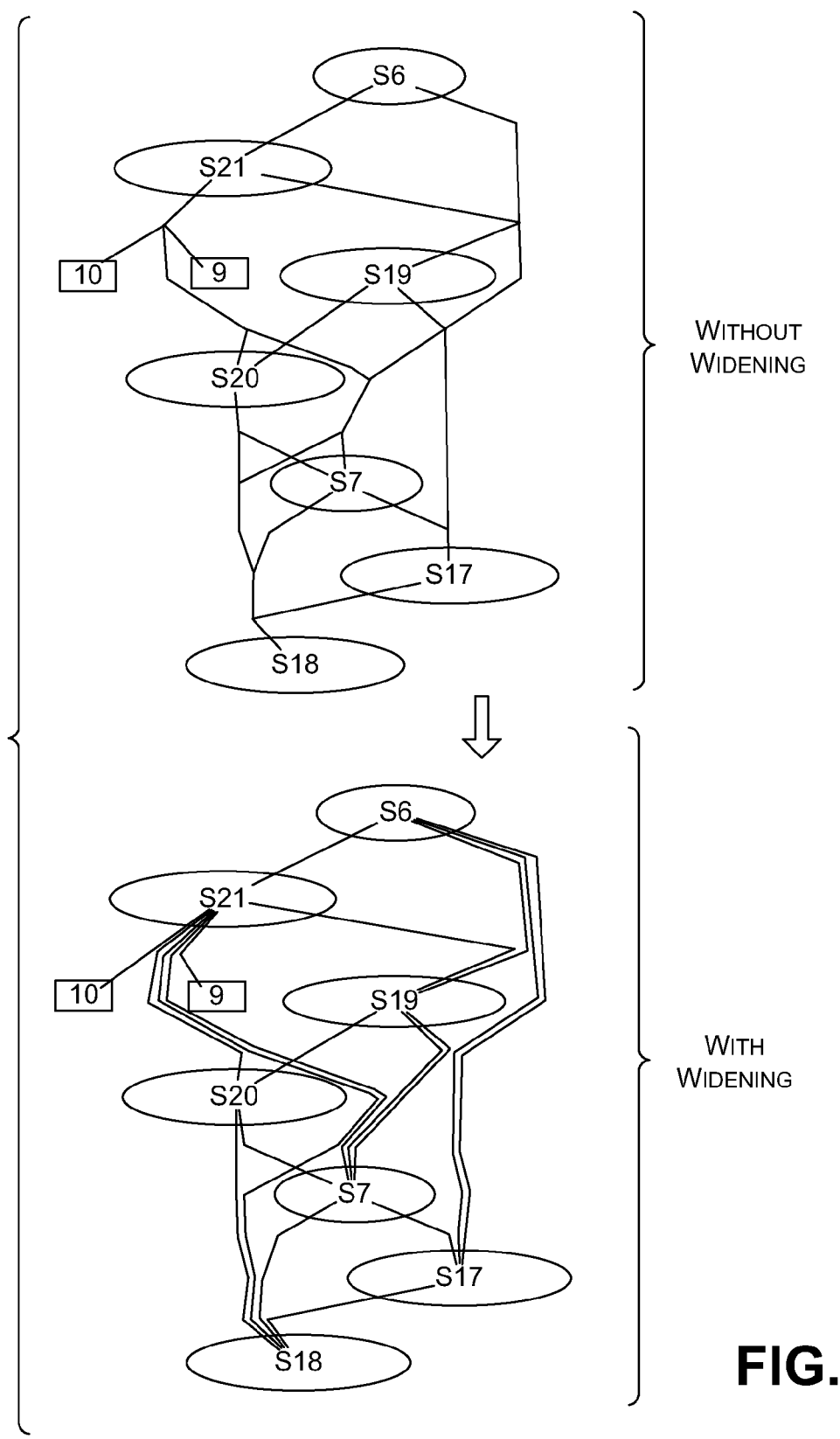
FIG. 11 depicts operations performed on the graph in connection an edge widening operation identified in FIG. 4.
Figure 12:
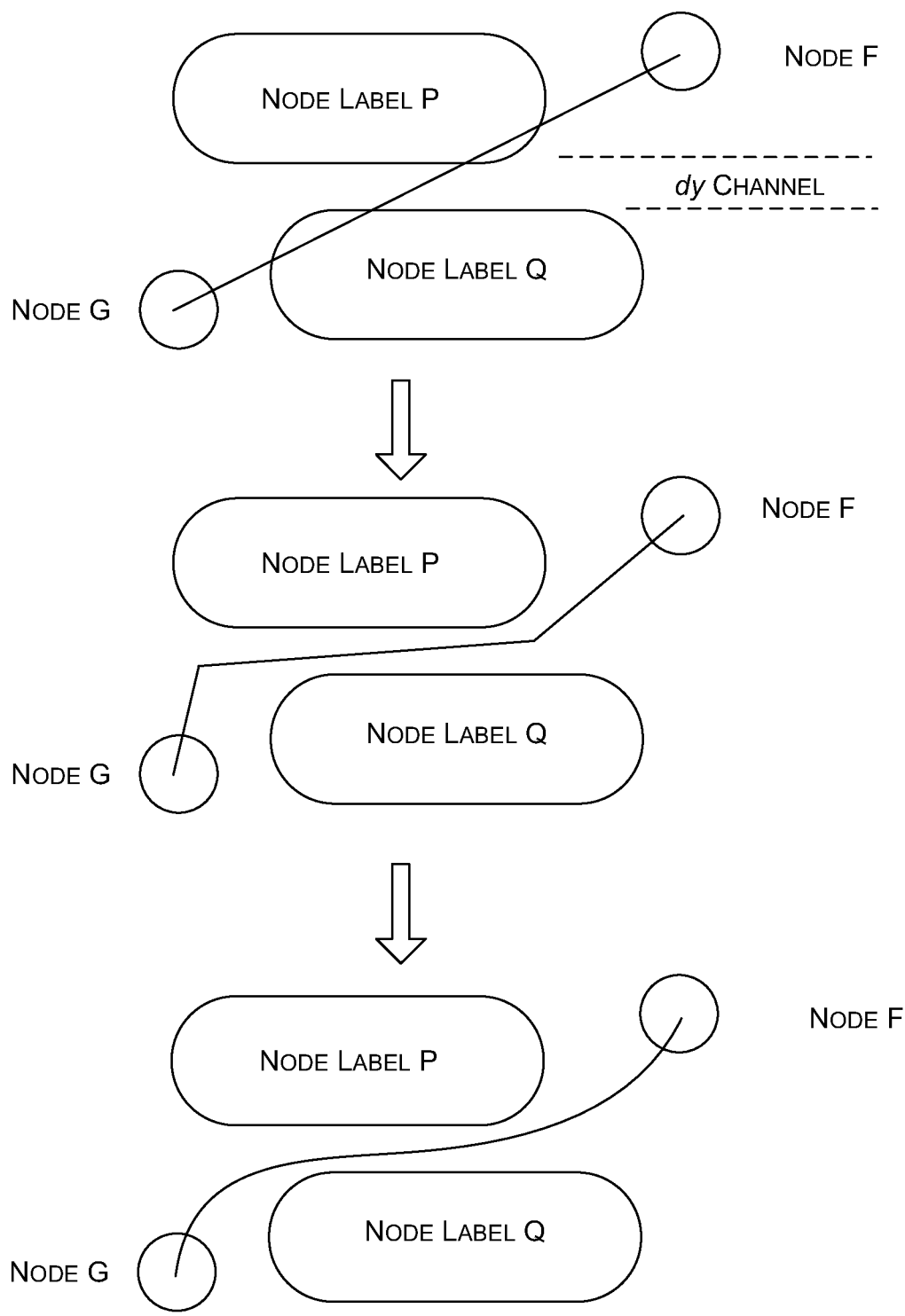
FIG. 12 depicts operations performed on the graph in connection with an edge rerouting operation identified in FIG. 4.
Figure 13:
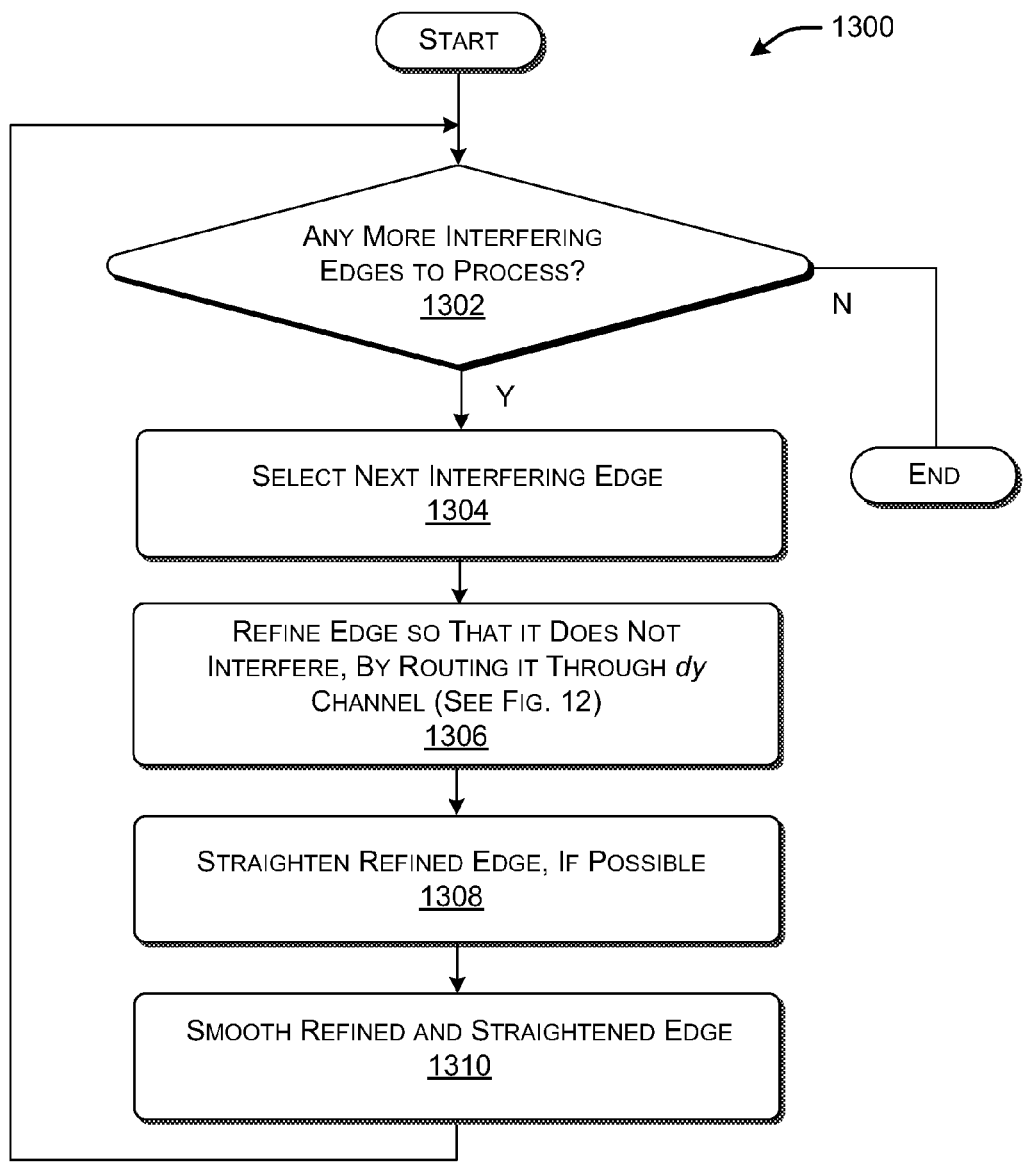
FIG. 13 is a flowchart which shows the edge rerouting operation of FIG. 4.

To begin with FIG. 4 shows a procedure 400 which presents an overview of the operations performed by the graph processing module 102. In block 402, the graph processing module 102 receives the layered graph, e.g., as produced by the Sugiyama algorithm or some other technique. In block 404, the graph processing module 102 produces edge bundles, based on an objective of reducing an ink metric. FIGS. 5 and 6 provide additional detail on this operation. In block 406, the graph processing module 102 orders edge components associated with the edge bundles. FIGS. 7 and 8 provide additional detail regarding this operation. In block 408, the graph processing module 102 straightens the edge components associated with the edge bundles. FIGS. 9 and 10 provide additional information regarding this operation. In block 410, the graph processing module 102 separates the edge components within edge bundles using a separation parameter, to produce a graph with separated edge components. FIG. 11 provides additional detail on this operation. In block 412, the graph processing module 102 reroutes edges to avoid interference with node objects or the like. FIGS. 12 and 13 provide additional details regarding this operation. Finally, in block 414, the graph processing module 102 outputs the processed graph which reflects the results of the processing performed in the procedure 400 as a whole.

B.1. Bundling of Edges

Advancing to FIG. 5, this figure depicts an example of the edge bundling operation in block 404 of FIG. 4. To begin with, a graph 502 (at the top of FIG. 5) represents an original graph before application of the Sugiyama algorithm. The graph 502 includes a set of original nodes. A set of original edges connects the original nodes together. For example, an edge e(u, v) connects an original source node u with an original target node v. In its original form, the graph 502 can be conceptualized as having two layers.

A graph 504 (in the middle of FIG. 5) represents the outcome of the Sugiyama algorithm for a hypothetical case. In other words, the graph 504 represents a proper graph. Here, assume that the Sugiyama technique introduces two additional layers of virtual nodes to the original graph 502. Namely, the black nodes represent original nodes and the white nodes represent added virtual nodes. Virtual nodes are dummy entities that are added to facilitate processing. In this particular instance, the edge e(u, v) is now represented by a series of four nodes, $d_1=u$, $d_2$, $d_3$, and $d_4=v$. The terminal nodes ($d_1$ and $d_4$) represent original nodes (e.g., an original source node and an original target node) while the middle modes ($d_2$ and $d_3$) represent virtual nodes (e.g., a virtual source node and a virtual target node). This sequence of nodes can be collectively referred to as D(e). A polyline (a line composed of multiple segments) is defined by the positions of the nodes of D(e). Edge 506 is defined by virtual nodes 508 and 510 (e.g., nodes $d_2$ and $d_3$), while edge 512 is defined by virtual nodes 514 and 516.

The edge bundling module 112 operates by successively combining pairs of edges together. This has the effect of shifting the nodes of the two edges so that the edges coincide. For example, assume that the edge bundling module 112 first bundles the edge 506 with the edge 512 within the graph 504. To do so, the edge bundling module 112 merges the virtual node 508 with the virtual node 514 to create a single bundled node, and merges the virtual node 510 with the virtual node 516 to create another single bundled node. As a result, the edge bundling module 112 produces a single edge bundle that represents the connection between the two new bundled nodes. This edge bundle can be treated like any other edge in the graph, meaning that it is a candidate for further bundling with another edge. As a result of the bundling, the edge bundling module 112 also removes the prior edges (506, 512) and virtual nodes (508, 510, 514, 516). Next assume that the edge bundling module 112 bundles the edge created above (produced by combining edges 506 and 512) with edge 518. Again, this operation has the effect of consolidating two edges into one edge bundle.

The bundled graph 520 shown at the bottom of FIG. 5 illustrates the outcome of these two merging operations. It includes a bundled virtual source node 522 and a bundled virtual target node 524, which establish an edge bundle 526. Each of the bundled nodes can be thought of as representing plural underlying virtual nodes, referred to below as node components; further, each of the edge bundles can be thought of as representing plural underlying edges, referred to below as edge components.

The edge bundling module 112 iteratively processes the graph in the manner described above, successively bundling edges. The edge bundling module 112 uses a so-called ink metric to governing its operation. The ink metric represents the minimum collective lengths of edges within the graph that can be used to draw the graph, at any given point in time. For example, the bundled graph 520 shown in FIG. 5 includes three edges which connect original source nodes with the bundled virtual node 522, and three edges which connect original target nodes with the bundled virtual node 524, together with the edge bundle 526. The ink metric in this case represents the sum of these seven edges; more specifically, because these line segments are straight, the sum also represents the minimum collective length of edges that can be used to draw the graph. Presume that the collective length of the edges within the bundled graph 520 is less than the collective length of the edges shown in the graph 504 prior to this bundling (even though, depending on the scaling of FIG. 5, this may not be literally true). The graph processing module 102 combines edges in this manner under the operating assumption that a graph with less "ink" is less cluttered, and therefore easier to understand.

More specifically, as will be described in greater detail below, the edge bundling module 112 uses the ink metric to determine, at any given time, which two edges are most appropriate to combine together. The edge bundling module 112 also uses the ink metric to determine when to terminate the edge bundling procedure.

FIG. 6 explains these operations in further detail in flowchart form. Namely, FIG. 6 shows a procedure 600 for bundling edges in the layered graph. FIG. 6 uses a layer-by-layer strategy to bundle pairs of edges together. Other implementations can form edge bundles using other strategies.

In block 602, the graph processing module 102 receives the layered graph, which has an initial set of edges, along with a collection of original nodes and virtual nodes (and their positions). In one approach, the procedure 600 begins its analysis at the first layer that contains candidate edges to bundle together; thus, $layer_i$ is set to 1. (More generally, the explanation below will make shorthand reference to processing performed on a $layer_i$; this processing is to be understood as referring to analysis of edges that can be formed between $layer_i$ and $layer_{i+1}$.)

In block 604, the edge bundling module 112 determines whether it is possible to combine any two edges together in layer, to produce a resultant decrease in the ink metric in the graph as a whole. If this block 604 is answered in the negative, then the procedure 600 advances to the next layer, if such a layer exists.

In block 606, the edge bundling module 112 determines two candidate edges in layer$_i$ to combine together to reduce the ink metric. The edge bundling module 112 can use different approaches to perform this task. In one case, the edge bundling module 112 identifies the two edges in layer$_i$ which, if combined, will produce the greatest reduction in the ink metric compared to other possible pairings of edges in layer$_i$. As will be described below, not every pair of edges is a candidate for this combination; hence, block 606 qualifies the identified pair as being a valid pair. Generally, blocks 604 and 606 can be viewed as an integral operation; namely, if, in block 606, the edge bundling module 112 cannot find any pair of edges in layer$_i$ that will reduce the ink metric, then it advances to the next layer (if there is such a layer).

In block 608, the edge bundling module 112 combines the identified pair of edges together in the manner described above (as shown in FIG. 5). This operation also involves selecting the positions of the bundled nodes, e.g., node 522 and node 524 in FIG. 5; these nodes (522, 524) also define the location of the edge bundle 526. In one case, the edge bundling module 112 can determine the x coordinate position of a bundled node by computing the average of the positions of the two node components that are combined together to create the bundled node. This is one example of how to determine the position of a bundled node; other approaches can adopt other techniques for determining the position.

In block 610, the edge bundling module 112 updates the ink metric to reflect the outcome of the bundling operation in block 608, e.g., to take account for the new edge structure of the graph. An edge bundle that has been created is treated as an edge that can be combined with another edge in layer$_i$ upon a subsequent iteration of the procedure 600. However, this bundle is not fixed. For example, the edge bundling module 112 can determine, upon a subsequent iteration, that it is advantageous to combine an edge that is currently a member of an edge bundle with another edge (that is not a member of that edge bundle). In this case, the edge bundling module 112 can be thought of as metaphorically breaking a prior edge bundle and forming a new edge bundle.

Presume now that block 604 is answered in the negative, meaning that no additional edges can be combined in layer$_i$ to reduce the ink metric. If so, in block 612, the edge bundling module 112 determines whether there is a next layer to process. If so, in block 614, layer$_i$ is redefined as layer$_{i+1}$ and the above-described procedure in blocks 604-610 is repeated. In other words, after processing layer$_1$, the edge bundling module 112 moves on to layer$_2$, etc. When processing layer$_2$, the edge bundling module 112 forms edge bundles between layer$_2$ and layer$_3$.

The edge bundling module 112 can repeat the entire procedure 600 one or more times, e.g., until it is determined that the ink metric cannot be reduced further, and/or it is determined that a defined maximum number of iterations has been reached, etc. Thus, if block 612 is answered in the affirmative, the edge bundling module 112 determines, in block 616, whether it is appropriate to repeat the entire procedure 600, starting with the first layer of the graph. If block 616 is answered in the affirmative, then, in block 618, layer$_i$ is reset to layer$_1$.

As mentioned above, various constraints may define the nature of valid candidate edges that can be bundled together. Without limitation, in one implementation, the following four rules can govern the operation of block 606 of FIG. 6. A user can enable or disable any rule. Further, a user can create new rules or modify existing rules in any manner.

Rule I. Any two edges $(f_1, g_1)$ and $(f_2, g_2)$ can be bundled only if they span the same pair of layers, e.g., $f_1 \in$ layer$_i$ and $f_2 \in$ layer$_i$ for some i.

Rule II. If an edge has an original source node, then it can be only bundled with an edge with the same source node. Similarly, if any edge has an original target node, then it can be only bundled with an edge with the same target node.

Rule III. Any two edges can be bundled together if their respective source nodes are not separated by an original node of the corresponding source layer. Similarly, any two edges can be bundled together if their target nodes are not separated by an original node of the corresponding target layer.

Rule IV. A bundling of two edges is allowed only if it does not introduce turns of the original edges that are sharper than some parameter. Without limitation, in one illustrative implementation, this rule can stipulate that an original edge is not permitted to turn more than $\pi/6$ after a bundling. This rule helps eliminate highly curved edges, which a user may find aesthetically unappealing and confusing.

Further, and more generally, the edge bundling module 112 will not seek to combine together any original nodes. Nor, in one implementation, will the edge bundling module 112 modify the positions of the original nodes. Other implementations can relax these rules in various respects. For example, another implementation can allow positions of the original nodes to be modified.

Further, various rules can be adopted to expedite the bundling operation. In one such rule, the edge bundling module 112 can restrict the edges that it considers for bundling to lateral neighbors within a layer, e.g., with no intermediary edges. In another such rule, if the edge bundling module 112 combines two edges together that have one or more intermediary edges, it can collapse all edges (including the intermediary edge(s)) into a single edge bundle. Still other acceleration options are possible.

B.2. Ordering of Edges

Advancing to FIGS. 7 and 8, these figures depict an example of the operation of the edge ordering operation in block 406, as performed by the edge ordering module 114. This operation helps disambiguate the graph produced by the edge bundling module 112, e.g., by reducing edge crossings in the graph.

More specifically, as explained above, each edge bundle is associated with a bundled source node (e.g., bundled node 522 in FIG. 5) and a bundled target node (e.g., bundled node 524 in FIG. 5). Each of these bundled nodes, in turn, may act as a placeholder for a set of former virtual nodes that have been bundled together, referred to as node components. Similarly, each edge bundle may act as a placeholder for a set of former edges that have been bundled together, referred to as edge components. In this context, the edge ordering module 114 operates to determine the ordering of node components associated with an edge bundle (that encompasses two or more components), which, in turn, determines the order of edge components associated with an edge bundle.

As a general principle, the edge ordering module 114 seeks to minimize edge crossings associated with each edge bundle. More formally stated, consider a graph that includes a set of nodes, which can be referred to as stations. The edge components associated with an edge bundle can be referred to as lines. The edge ordering module 114 seeks to determine the ordering of the lines at each station so that the number of crossings among pairs of lines is minimized.

More specifically, the graph includes original nodes associated with original stations and virtual nodes associated with internal stations. The edge ordering module 114 operates by iterating over the stations to determine the ordering of lines (and hence the ordering of node components) at each internal station. (In one implementation, the edge ordering module 114 does not change the order of lines at original stations.) This operation, in turn, can be formulated as a series of rules that address different possible scenarios that may be encountered. Namely, these rules determine the ordering of lines at internal stations associated with edge bundles. These rules reflect one representative implementation. Other implementations can rely on other rules.

Consider two lines $p_1$ and $p_2$. These lines represent a possible sequence of stations, e.g., $p_1=u_1, u_2, \ldots, u_{k1}, A_1, A_2, \ldots, A_{r\_a}, u_{k1+1}, u_{k1+2}, \ldots, u_{k2}, B_1, B_2, \ldots, B_{r\_b}, \ldots$, etc. and $p_2=z_1, z_2, \ldots, z_{m1}, A_1, A_2, \ldots, A_{r\_a}, z_{m1+1}, z_{m1+2}, \ldots, z_{m2}, B_1, B_2, \ldots, B_{r\_b}, \ldots$, etc. The subsequences $A_1, A_2, \ldots, A_{r\_a}$, and $B_1, B_2, \ldots, B_{r\_b}$, etc. correspond to the common sub-paths of lines $p_1$ and $p_2$. The stations denoted by u and z are not parts of common sub-paths. Any two subsequent stations of these sequences lie on neighboring layers.

Rule I for Scenario A. Assume that $p_1=u_i, A_1, A_2, \ldots, A_{r\_a}, u_{i+1} \ldots$, and $p_2= \ldots, z_j, A_1, A_2, \ldots, A_{r\_a}, z_{j+1} \ldots$, where $A_1, A_2, \ldots, A_{r\_a}$ is a common sub-path of $p_1$ and $p_2$. The stations represented by u and z are not part of the common sub-path. Assume without loss of generality that $x_{u_i} < x_{z_j}$, meaning that the non-common station $u_i$ occurs before the non-common station $z_j$ on the x axis. In this case, the edge ordering module 114 determines that $p_1 < p_2$ at an internal station if and only if $x_{u_{i+1}} < x_{z_{j+1}}$.

FIG. 7 plots an example of Scenario A (upper left). Here, assume that the non-common stations $u_i$ and $z_j$ are coupled to common node $A_1$ that is part of an edge bundle. The common node $A_1$ is connected to common station $A_2$, which is also part of the edge bundle. The common station $A_2$, in turn, is connected to non-common stations $u_{i+1}$ and $z_{j+1}$. Here, $x_{u_{i+1}} > x_{z_{j+1}}$, meaning that station $z_{j+1}$ occurs before station $u_{i+1}$ on the x axis. Assume that the edge ordering module 114 seeks to determine whether line $p_1$ will precede line $p_2$ at station $A_1$. Since $x_{u_{i+1}} > x_{z_{j+1}}$, the above rule is not invoked, and therefore $p_2 < p_1$, which means that line $p_2$ will appear before line $p_1$ at common station $A_1$. This also means that there is an edge crossing at station $A_1$.

Rule II for Scenario B. Here, $p_1=u_i, A_1, A_2, \ldots, A_{r\_a}$, and $p_2=z_j, A_1, A_2, \ldots, A_{r\_a}$. In other words, $p_1$ and $p_2$ have the same tail station, as shown in the example of FIG. 7 (for Scenario B, upper right, where $p_1$ and $p_2$ have the same tail station $A_2$). Here, $p_1$ and $p_2$ are ordered based on the sorted order of $x_{u_i}$ and $x_{z_j}$. For instance, if $x_{u_i} < x_{z_j}$, then $p_1 < p_2$. In the example of FIG. 7 (for Scenario B), assume that the edge ordering module 114 seeks to determine whether $p_1$ should precede $p_2$ at internal station $A_1$, or vice versa. Here, the position of $u_i$ is in fact less than the position of $z_j$; thus, at station $A_1$, the line $p_1$ is placed before the line $p_2$ on the x axis.

Rule III for Scenario C. Here, $p_1=A_1, A_2, \ldots, A_{r\_a}, u_i$, and $p_2=A_1, A_2, \ldots, A_{r\_a}, z_j$. In other words, $p_1$ and $p_2$ start with the same head station. Again, assume without loss of generality that $x_{u_i} < x_{z_j}$. Here, $p_1 < p_2$ for every internal station A. In the example of FIG. 7 (Scenario C, lower left), assume that the edge ordering module 114 seeks to determine whether $p_1$ should precede $p_2$ at internal station $A_2$, or vice versa. Here, the position of $u_i$ is in fact less than the position of $z_j$, so, at station $A_1$, the line $p_1$ is placed before the line $p_2$ on the x axis Rule IV for Scenario D. Here, $p_1=A_1, A_2, \ldots, A_{r\_a}$, and $p_2=A_1, A_2, \ldots, A_{r\_a}$. In other words, here, $p_1$ and $p_2$ share the same path. Here, the order of $p_1$ and $p_2$ is arbitrary, but the edge ordering module 114 keeps the lines in the same order for every $A_t$ within the common sub-path.

In some cases, the edge ordering module 114 may not be able to avoid an edge crossing. An unavoidable crossing occurs for a pair of lines $p_1= \ldots, u_i, A_1, A_2, \ldots, A_{r\_a}, u_{i+1} \ldots$, and $p_2= \ldots, z_j, A_1, A_2, \ldots, A_{r\_a}, z_{j+1} \ldots$, where $u_i$ and $z_j$ lie on the same layer and $(x_{u_i} - x_{z_j}) \cdot (x_{u_{i+1}} - x_{z_{j+1}}) < 0$ (although, r_a can be equal to 0, as in Scenario E of FIG. 7, lower right).

FIG. 8 shows a procedure 800 which summarizes the above discussion in flowchart form.

In block 802, the graph processing module 102 determines whether it has processed all bundled nodes to be processed. If not, in block 804, the graph processing module 102 selects the next bundled node to be processed. The graph processing module 102 can process the bundled nodes in any order.

In block 806, the edge ordering module 114 determines the order of edge components associated with the bundled node being processed. In the terminology developed above, block 806 seeks to determine the order of lines associated with an internal station.

B.3. Straightening of Edges

Advancing to FIG. 9, this figure shows an example of the operation of the edge straightening module 116. The edge straightening module 116 generally acts to straighten the edges in the graph, which may make the edges more vertical in appearance.

FIG. 9 shows an illustrative portion of a graph that is associated with an edge bundle. The portion includes two layers, e.g., $layer_i$ and $layer_{i+1}$, where $layer_{i+1}$ is a neighboring layer with respect to $layer_i$. A first node set ($V_b$) of identified nodes is associated with $layer_i$, and a second node set ($N_b$) of neighboring nodes is associated with $layer_{i+1}$. The node set $V_b$ comprises a single bundled node that may encompass plural node components. For example, in the example of FIG. 9, the single bundled node 902 in node set $V_b$ may be associated with two or more node components (not shown) that have been bundled together in the manner described above. By contrast, the neighboring node set $N_b$ may include nodes from different bundles. Assume that, at a particular point of time, the edge straightening module 116 aims to adjust the x-axis position T of the bundled node in the identified node set ($V_b$) with respect to the node set ($N_b$). The nodes in $V_b$ are referred to herein as identified nodes because these nodes are identified as the nodes to be processed at the present point in time.

More generally, the edge straightening module 116 adjusts the position of the identified node set $V_b$ with reference to a neighboring node set in either the preceding layer, i.e., $layer_{i-1}$, or the subsequent layer, i.e., $layer_{i+1}$. In one illustrative implementation, the edge straightening module 116 can first advance in the downward direction through the graph, processing identified node sets in the graph on a layer-by-layer basis, e.g., in the direction of increasing layer numbers. In this mode of processing, the edge straightening module 116 determines the position of the identified node set with reference to the neighboring node set in the $layer_{i-1}$. After processing the graph in the downward direction, the edge straightening module 116 processes it in the upward direction, e.g., proceeding layer-by-layer in the direction of decreasing layer numbers Here, the edge straightening module 116 determines the position of the identified node set with respect to the neighboring node set in $layer_{i+1}$. Generally stated, the edge straightening module 116 attempts to shift each set of identified nodes with respect to its neighboring node set in the layer behind it (with respect to its present direction of travel through the graph). In the example of FIG. 9, the edge straightening module 116 is moving in the upward direction, since it is using the neighboring node set in $layer_{i+1}$.

In either case (downward or upward), the edge straightening module 116 operates by identifying the position T for the set of identified nodes, e.g., corresponding to the position of its bundled node. The edge straightening module 116 also calculates a representative position for the set of neighboring nodes, such as a median position ($N_{median}$). The edge straightening module 116 can then offset the position T of the identified node set based on an offset rule. In the example of FIG. 9, the bundled node in $V_b$ is moved over so that its new position corresponds to the median ($N_{median}$) of the neighboring node set $N_b$.

In one non-limiting implementation, the edge straightening module 116 may be constrained by one or more rules, such as:

Rule I. The identified node set is shifted only if the new position of this node set does not interfere with the shapes of the node objects associated with the original nodes of the corresponding layer.

Rule II. The number of turns in the edge polylines passing through the shifted node components does not increase as a result of the straightening.

FIG. 10 shows a procedure 1000 which summarizes the explanation given above in the form a flowchart.

In block 1002, the edge straightening module 116 determines whether there is another identified node set $V_b$ to process in the graph. More specifically, in one implementation, the edge straightening module 116 first processes the graph on a layer-by-layer basis in the downward direction; thus, in block 1002, the edge straightening module 116 determines whether there are any identified node sets left to process in its downward processing of the graph. If the conditional in block 1002 is answered in the affirmative, then, in block 1004, the edge straightening module 116 selects the next identified node set to be processed.

In block 1006, the edge straightening module 116 identifies the position T of the identified node set $V_b$, e.g., corresponding to the position of the bundled node that defines the identified node set.

In block 1008, the edge straightening module 116 determines a representative position for the neighboring node set in the neighboring layer$_{i+1}$, such as $N_{median}$.

In block 1010, the edge straightening module 116 adjusts the position of the identified node set $V_b$ based on the positions determined in blocks 1006 and 1008.

In block 1012, the edge straightening module 116 removes the effects of block 1010 if these effects violate any of the rules described above.

The procedure 1000 of FIG. 10 proceeds in the manner described above in the downward direction until it exhausts all the identified node sets to be processed. Then it performs the same operations (as indicated in block 1014) in the upward direction, proceeding layer-by-layer in the direction of decreasing layer numbers. In the upward direction, the neighboring node sets to be considered are those in layer$_{i+1}$.

Block 1016 indicates that the entire procedure 1000 can be repeated one or more times to iteratively improve the alignment of the edges. If the procedure 1000 is to be repeated, the edge straightening module 116 advances through the identified node sets in the manner described above, e.g., first in the downward direction and then in the upward direction.

B.4. Widening of Edges

Advancing to FIG. 11, this figure illustrates the operation of the edge widening module 118. That is, at this stage, the edge ordering module 114 has determined the order in which a set of node components (associated with a particular edge bundle) are to be placed on the x axis. The edge widening module 118 determines the actual positions of these node components along the x axis. More specifically, the edge widening module 118 chooses the positions of the node components so as to spread the node components out along the x axis.

More formally stated, assume that there are k node components associated with a particular bundled node. Assume that the bundled node itself (e.g., node 522 of FIG. 5) has the position $x_{initial}$. The edge widening module 118 determines the new x positions of the node components as: $x_0 = x_{initial} - \delta \cdot k/2$ (for the first node component in the set) and $x_i = x_{i-1} + \delta$ for (for subsequent node components, i=1, . . . , k). Here, $\delta$ is a separation parameter. The separation parameter can be considered as the "bundle strength" of the set of node components.

FIG. 11 shows a portion of a graph before and after application of the edge widening module 118. Note that, before widening, the connection among nodes is vague due to the fact that the edge components of the edge bundles overlap each other. The edge widening module 118 disambiguates the constituents of the edge bundles, while still preserving the general the appearance of groupings among edges.

B.5. Reducing Interference with Node Objects

FIG. 12 shows the operation of the edge rerouting module 120 of FIG. 4. The edge rerouting module 120 changes the path of an edge if that edge intersects or otherwise interferes with a node object (or any other object in a graph presentation). For example, in the illustrated example, the edge that is drawn between nodes F and G intersects the bubbles associated with node labels P and Q.

FIG. 13 shows a procedure 1300 for addressing the issue shown in FIG. 12. In block 1302, the edge rerouting module 120 determines if there is an edge which interferes with a node object or the like. If that is true, in block 1304, the edge rerouting module 120 selects the next edge to be processed for rerouting.

In block 1306, the edge rerouting module 120 refines the interfering edge such that it is rerouted around the node objects. The edge rerouting module 120 can perform this operation by identifying a dy channel of free space between the node objects in question—here, node label P and node label Q. The edge rerouting module 120 then constructs a multi-segment line using the dy channel which avoids the perimeter of these node objects. The middle portion of FIG. 12 illustrates the outcome of this operation.

In block 1308, the edge rerouting module 120 can straighten the multi-segment line that has been drawn in block 1306, e.g., by investigating whether it can replace any two line segments with a single straight line. However, if doing so will produce a fundamental change in the edge path (e.g., by routing the edge through a new channel), the edge rerouting module 120 can decline to make such a shortcut.

In block 1310, the edge rerouting module 120 can replace the straight line segments associated with the rerouted edge with smooth segments, such as Bezier segments. The bottom portion of FIG. 12 illustrates the final outcome of the processing shown in FIG. 13.

C. Representative Processing Functionality

FIG. 14 sets forth illustrative electrical data processing functionality 1400 (simply "processing functionality" below) that can be used to implement any aspect of the functions described above. With reference to FIG. 1, for instance, the type of processing functionality 1400 shown in FIG. 14 can be used to implement any aspect of the system 100, such as the graph processing module 102. In one case, the processing functionality 1400 may correspond to any type of computing device.

The processing functionality 1400 can include volatile and non-volatile memory, such as RAM 1402 and ROM 1404, as well as one or more processing devices 1406. The processing functionality 1400 also optionally includes various media devices 1408, such as a hard disk module, an optical disk module, and so forth. The processing functionality 1400 can perform various operations identified above when the processing device(s) 1406 executes instructions that are maintained by memory (e.g., RAM 1402, ROM 1404, or elsewhere). More generally, instructions and other information can be stored on any computer-readable medium 1410, including, but not limited to, static memory storage devices, magnetic storage devices, optical storage devices, and so on. The term "computer-readable medium" also encompasses plural storage devices.

The processing functionality 1400 also includes an input/output module 1412 for receiving various inputs from a user (via input devices 1414), and for providing various outputs to the user (via any output device or combination of devices). One particular output mechanism may include a display device 1416 and an associated graphical user interface (GUI) 1418. The processing functionality 1400 can also include one or more network interfaces 1420 for exchanging data with other devices via one or more communication conduits 1422. For example, the network interface 1420 can allow a remote user to access the services of the graph processing module 102, which may be implemented by logic provided by the processing functionality 1400. One or more communication buses 1424 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for visualizing a graph using a computer having one or more processing devices and memory, comprising:
    receiving a layered graph that includes a set of nodes and edges, the nodes being arranged in a series of layers, the nodes including at least one original node and at least one virtual node;
    iteratively bundling pairs of edges in the layered graph, layer-by-layer, to produce respective edge bundles, by, for each layer successively, determining bundled pairs of edges such that each respectively determined bundled pair of edges produces a greatest respectively determined reduction in an ink metric value of collective lengths of edges of the layered graph;
    ordering edge components associated with each edge bundle, each of the edge components representing a plurality of underlying bundled edges of each respective edge bundle;
    straightening the edge components associated with the edge bundles;
    separating the edge components associated with each edge bundle with respect to each other, to provide a processed graph; and
    presenting the processed graph on an output device.

2. The method of claim 1, wherein the layered graph represents a graph produced by a Sugiyama algorithm.

3. The method of claim 1, wherein said bundling comprises:
    identifying a pair of edges within the layered graph to bundle that will produce a desired reduction in the ink metric, to provide an identified pair of edges, the ink metric relating to a collective length of edges within the layered graph;
    uniting the identified pair of edges to produce an edge bundle, the edge bundle defining a new edge; and
    updating the ink metric to account for the presence of the new edge,
    wherein said identifying, uniting, and updating are repeated a plurality of times to successively reduce the ink metric.

4. The method of claim 3, wherein the identified pair of edges is a pair of edges which produces a maximum reduction in the ink metric.

5. The method of claim 3, wherein said identifying, uniting, and updating are repeated until it is determined that the ink metric can no longer be decreased.

6. The method of claim 1, wherein said bundling is subject to at least one rule selected from a set of rules.

7. The method of claim 6, wherein one rule in the set of rules specifies that a pair of edges is a candidate for bundling if the pair spans a same pair of layers.

8. The method of claim 6, wherein one rule in the set of rules specifies that:
    if a first edge includes an original source node, the first node is a candidate for bundling with a second edge if the second edge has a same source node; and
    if the first edge includes an original target node, the first node is a candidate for bundling with the second edge if the second edge has a same target node.

9. The method of claim 6, wherein one rule in the set of rules specifies that a pair of edges is a candidate for bundling if respective source nodes of the pair of edges are not separated by an original node of a corresponding source layer, and respective target nodes of the pair of edges are not separated by an original node of a corresponding target layer.

10. The method of claim 6, wherein one rule in the set of rules specifies that a pair of edges is a candidate for bundling if bundling of the pair does not introduce an edge turn that is greater than a prescribed threshold.

11. The method of claim 1, wherein said ordering, performed with respect to each edge bundle, reduces crossings among edge components associated with each edge bundle.

12. The method of claim 1, wherein said straightening comprises shifting an identified node set in a layer i with respect to a neighboring node set in an adjacent layer.

13. The method of claim 12, wherein said shifting is performed based on a median determined for the neighboring node set.

14. The method of claim 12, further comprising:
    performing the straightening in a direction of increasing layer numbers, wherein the neighboring node set comprises an antecedent set of nodes with respect to the identified node set; and
    performing the straightening in a direction of decreasing layer numbers, wherein the neighboring node set comprises a subsequent set of nodes with respect to the identified node set.

15. The method of claim 1, wherein said separating, performed with respect to each edge bundle, separates edge components associated with the edge bundle with respect to each other, based on a separation parameter.

16. The method of claim 1, further comprising rerouting at least one edge to reduce interference with at least one node object.

17. A computer-readable storage device for storing computer-readable instructions, the computer-readable instructions providing a graph processing module when executed by one or more processing devices, the computer-readable instructions comprising:

logic configured to bundle pairs of edges within a layered graph, layer-by-layer, to produce at least one edge bundle, the layered graph including a set of nodes and edges, the nodes being arranged in a set of layers, by, for each layer successively, determining bundled pairs of edges such that each respectively determined bundled pair of edges produces a greatest respectively determined reduction in an ink metric value of collective lengths of edges of the layered graph;

logic configured to order edge components associated with said at least one edge bundle, each of the edge components representing a plurality of underlying bundled edges of each respective edge bundle;

logic configured to straighten the edge components associated with said at least one edge bundle; and logic configured to separate the edge components associated with said at least one edge bundle, to yield a processed graph.

18. A graph processing module implemented as a computing device, comprising:

an edge bundling module configured to receive a layered graph that includes a set of nodes and edges, the nodes being arranged in a set of layers, the edge bundling module configured to iteratively bundle pairs of edges in the layered graph, layer-by-layer, to produce respective edge bundles, by, for each layer successively, determining the edge bundles such that each respectively determined edge bundle produces a greatest respectively determined reduction in an ink metric associated with the layered graph, the ink metric relating to a collective length of edges within the layered graph;

an edge ordering module configured to order edge components associated with each edge bundle to reduce crossings among the edge components, each of the edge components representing a plurality of underlying bundled edges of each respective edge bundle;

an edge straightening module configured to straighten the edge components associated with the edge bundles;

an edge widening module configured to separate the edge components associated with each edge bundle with respect to each other based on a separation parameter, to produce a processed graph;

at least one rules store for storing rules which govern operation of said graph processing module; and an output device for presenting a visual depiction of the processed graph.

19. The graph processing module of claim 18, wherein the output device is a display device.

20. The graph processing module of claim 18, further comprising an edge rerouting module configured to reroute at least one edge to reduce interference with at least one node object.

\* \* \* \* \*